US010639916B2

(12) United States Patent
Tobita

(10) Patent No.: US 10,639,916 B2
(45) Date of Patent: May 5, 2020

(54) CONVEYANCE DEVICE, CONVEYANCE SYSTEM, AND HEAD UNIT POSITION ADJUSTING METHOD

(71) Applicant: Katsuhiro Tobita, Kanagawa (JP)

(72) Inventor: Katsuhiro Tobita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/926,910

(22) Filed: Mar. 20, 2018

(65) Prior Publication Data

US 2018/0272770 A1 Sep. 27, 2018

(30) Foreign Application Priority Data

Mar. 21, 2017 (JP) .................................. 2017-054029
Mar. 16, 2018 (JP) .................................. 2018-050039

(51) Int. Cl.
| | | |
|---|---|---|
| *B41J 25/00* | (2006.01) |
| *B65G 47/26* | (2006.01) |
| *B41J 25/304* | (2006.01) |
| *B41J 2/045* | (2006.01) |
| *B41J 11/00* | (2006.01) |
| *B41J 2/21* | (2006.01) |

(52) U.S. Cl.
CPC ......... *B41J 25/001* (2013.01); *B41J 2/04586* (2013.01); *B41J 2/2146* (2013.01); *B41J 11/0095* (2013.01); *B41J 25/304* (2013.01); *B65G 47/268* (2013.01); *B41J 2025/008* (2013.01)

(58) Field of Classification Search
CPC ...... B41J 11/0095; B41J 29/393; B41J 29/38; B41J 11/008; B41J 25/308; B41J 25/001; B41J 2/2146; B41J 2/04586; B41J 11/42; B41J 2025/008; B41J 25/304
USPC ................ 347/8, 9, 14, 16, 19, 37, 101, 104
See application file for complete search history.

(56) References Cited

U.S. PATENT DOCUMENTS

| | | | |
|---|---|---|---|
| 8,172,357 B2 * | 5/2012 | Enomoto ............... | B41J 25/001 347/19 |
| 2002/0081132 A1 | 6/2002 | Miyamoto et al. | |
| 2002/0131804 A1 | 9/2002 | Nakazawa et al. | |
| 2003/0039496 A1 | 2/2003 | Miyamoto et al. | |

(Continued)

FOREIGN PATENT DOCUMENTS

| | | |
|---|---|---|
| JP | 2007-253330 | 10/2007 |
| JP | 2011-136526 | 7/2011 |

*Primary Examiner* — Jannelle M Lebron
(74) *Attorney, Agent, or Firm* — Duft & Bornsen, PC

(57) ABSTRACT

A conveyance device includes a conveyor to convey a conveyed object in a conveyance direction, a head unit to perform an operation on the conveyed object, an actuator to move the head unit in a direction orthogonal to the conveyance direction, an actuator controller to control the actuator, a displacement sensor to detect a displacement amount representing an amount by which the head unit is moved by the actuator, and a controller. The controller is configured to calculate a detection result including at least one of a position of the conveyed object in the orthogonal direction, a speed of travel of the conveyed object, and a travel amount of the conveyed object. The controller is configured to calculate a command value based on the detection result and the displacement amount output from the displacement sensor, and output the command value to the actuator controller.

12 Claims, 28 Drawing Sheets

(56) References Cited

U.S. PATENT DOCUMENTS

| | | |
|---|---|---|
| 2005/0174379 A1 | 8/2005 | Nakazawa et al. |
| 2010/0310284 A1 | 12/2010 | Funato et al. |
| 2014/0044460 A1 | 2/2014 | Kudo et al. |
| 2014/0219670 A1 | 8/2014 | Masuda et al. |
| 2014/0268180 A1 | 9/2014 | Takaura et al. |
| 2015/0009262 A1 | 1/2015 | Bell et al. |
| 2016/0075157 A1 | 3/2016 | Morinaga et al. |
| 2016/0114576 A1 | 4/2016 | Tobita et al. |
| 2016/0121602 A1 | 5/2016 | Nagasu et al. |
| 2016/0136947 A1 | 5/2016 | Hommi et al. |
| 2016/0347050 A1 | 12/2016 | Hommi et al. |
| 2017/0106647 A1 | 4/2017 | Inoue et al. |
| 2017/0165960 A1 | 6/2017 | Sunaoshi et al. |
| 2017/0165961 A1 | 6/2017 | Hayashi et al. |
| 2017/0182764 A1 | 6/2017 | Nagasu et al. |
| 2017/0266954 A1 | 9/2017 | Nagasu et al. |
| 2017/0266965 A1 | 9/2017 | Gohda et al. |
| 2017/0348969 A1 | 12/2017 | Chiba et al. |
| 2017/0355205 A1 | 12/2017 | Tobita et al. |
| 2018/0022088 A1 | 1/2018 | Bando et al. |

\* cited by examiner

CONVEYANCE DEVICE, CONVEYANCE SYSTEM, AND HEAD UNIT POSITION ADJUSTING METHOD

CROSS-REFERENCE TO RELATED APPLICATIONS

This patent application is based on and claims priority pursuant to 35 U.S.C. § 119(a) to Japanese Patent Application Nos. 2017-054029 filed on Mar. 21, 2017 and 2018-050039 filed on Mar. 16, 2018, in the Japan Patent Office, the entire disclosure of each of which is hereby incorporated by reference herein.

BACKGROUND

Technical Field

This disclosure relates to a conveyance device, a conveyance system, and a method for adjusting a position of a head unit.

Description of the Related Art

There are various types of operation using a head unit. For example, there are image forming methods that include discharging ink from a print head (so-called inkjet method). To improve the quality of images formed on recording media, such image forming methods include, for example, adjusting the position of the print head relative to the recording media.

For example, to improve image quality, the position of the print head is adjusted. For example, there is a method for detecting fluctuations in position of a recording medium (e.g., a web) conveyed through a print system for printing on continuous sheets. Specifically, a sensor detects fluctuations in position of the recording medium in a lateral direction of the recording medium orthogonal to the direction in which the recording medium is conveyed. The position of the print head in the lateral direction is adjusted to compensate for the fluctuations in position detected by the sensor.

SUMMARY

According to an embodiment of this disclosure, a conveyance device includes a conveyor to convey a conveyed object in a conveyance direction, a head unit to perform an operation on the conveyed object, an actuator to move the head unit in a direction orthogonal to the conveyance direction, an actuator controller to control the actuator, a displacement sensor to detect a displacement amount representing an amount by which the head unit is moved by the actuator, and a controller. The controller is configured to calculate a detection result including at least one of a position of the conveyed object in the orthogonal direction, a speed of travel of the conveyed object, and a travel amount of the conveyed object. The controller is further configured to calculate a command value based on the detection result and the displacement amount output from the displacement sensor, and output the command value to the actuator controller.

According to another embodiment, a conveyance system includes a plurality of conveyance devices, each of which is similar to the above-described conveyance device and includes the conveyor, the head unit, the actuator, the actuator controller, and the displacement sensor described above. The conveyance system further includes a controller configured to calculate a detection result including at least one of a position of the conveyed object in the orthogonal direction, a speed of travel of the conveyed object, and a travel amount of the conveyed object; calculate a command value based on the detection result and the displacement amount output from the displacement sensor; and output the command value to the actuator controller.

Another embodiment provides a method for adjusting a position of a head unit to perform an operation on a conveyed object. The method includes detecting a displacement amount representing an amount by which the head unit is moved by an actuator in an orthogonal direction to a conveyance direction in which the conveyed object is conveyed; calculating a detection result including at least one of a position of the conveyed object in the orthogonal direction, a speed of travel of the conveyed object, and a travel amount of the conveyed object; and adjusting, with the actuator, the position of the head unit based on the detection result and the displacement amount.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
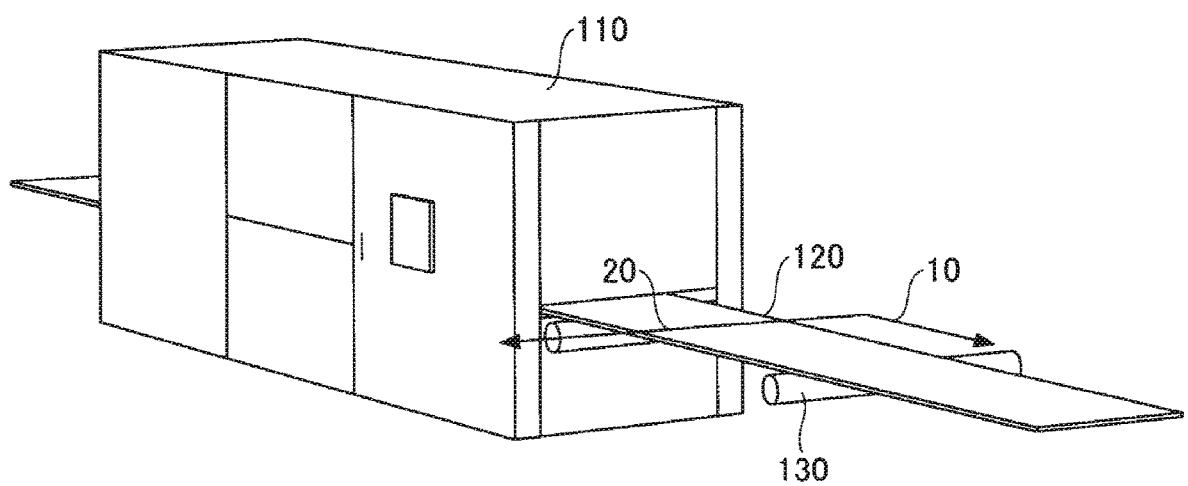
FIG. 1 is a schematic view of a liquid discharge apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, a conveyance according to an embodiment of this disclosure is described. As used herein, the singular forms "a", "an", and "the" are intended to include the plural forms as well, unless the context clearly indicates otherwise.

In the descriptions below, a head unit of a conveyance device is a liquid discharge head unit, and an operation position is a position at which processing is made on a web (a recording medium) with liquid discharged from the liquid discharge head unit. When the head unit of the conveyance device is a liquid discharge head unit to discharge liquid, the conveyance device is a liquid discharge apparatus.

The suffixes Y, M, C, and K attached to each reference numeral indicate only that components indicated thereby are used for forming yellow, magenta, cyan, and black images, respectively, and hereinafter may be omitted when color discrimination is not necessary.

FIG. 1 is a schematic view of a liquid discharge apparatus according to an embodiment. For example, the liquid discharge apparatus discharges recording liquid such as aqueous ink or oil-based ink. Descriptions are given below of a liquid discharge apparatus 110 that is an image forming apparatus.

The liquid discharge apparatus 110 illustrated in FIG. 1 conveys a conveyed object such as a web 120. In the illustrated example, the liquid discharge apparatus 110 includes a roller 130 and the like to convey the web 120, and discharges liquid onto the web 120 to form an image thereon. When an image is formed on the web 120 (i.e., a conveyed object), the web 120 is considered as a recording medium. The web 120 is a so-called continuous sheet. That is, the web 120 is, for example, a rolled sheet to be reeled. For example, the liquid discharge apparatus 110 is a so-called production printer. The description below concerns an example in which the roller 130 adjusts the tension of the web 120 and conveys the web 120 in a conveyance direction 10. Hereinafter, unless otherwise specified, "upstream" and "downstream" mean those in the conveyance direction 10. A direction orthogonal to the conveyance direction 10 is referred to as an orthogonal direction 20 (e.g., a width direction of the web 120). In the illustrated example, the liquid discharge apparatus 110 is an inkjet printer to discharge four color inks, namely, black (K), cyan (C), magenta (M), and yellow (Y) inks, to form an image on the web 120.

Figure 2:
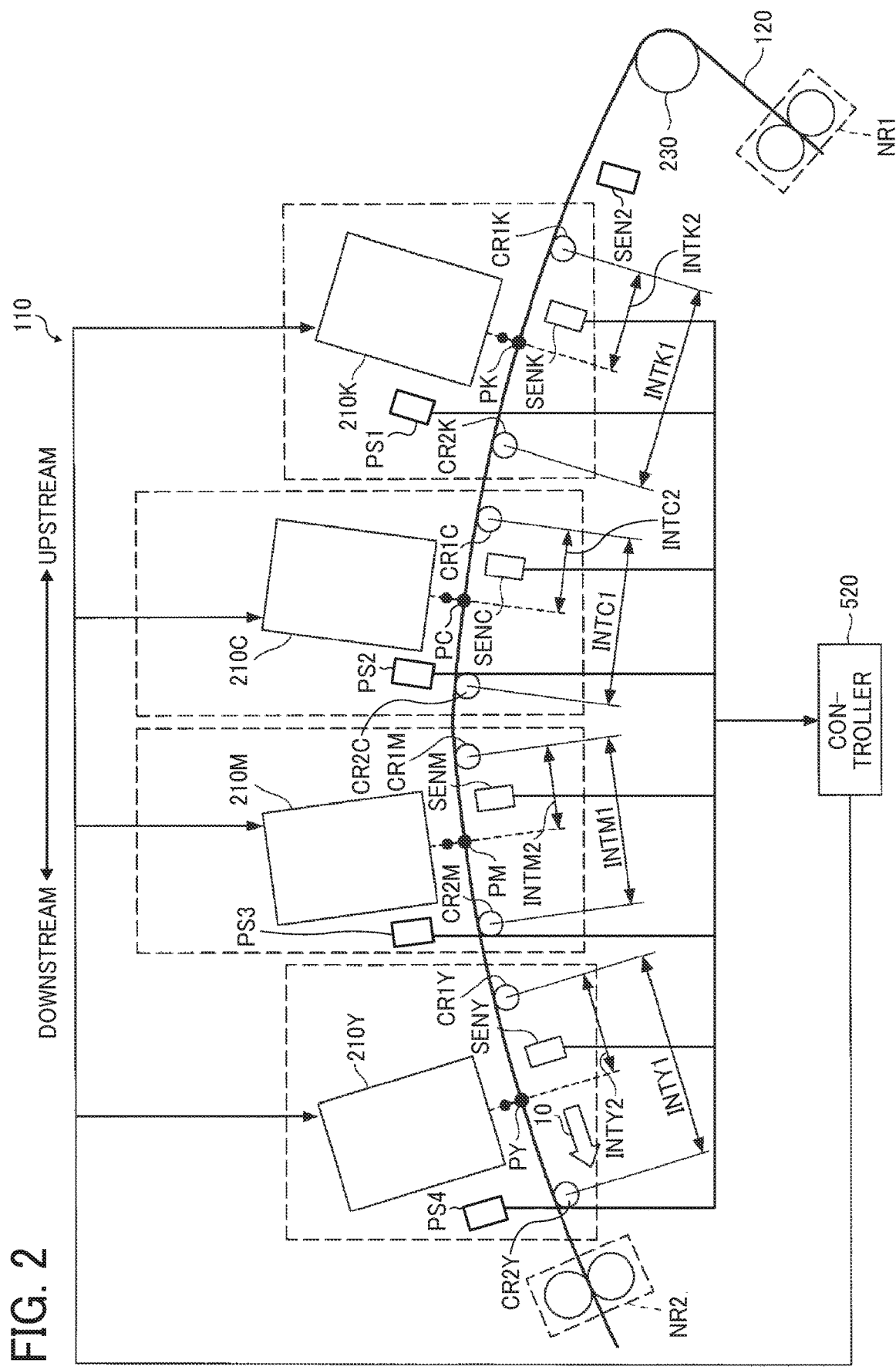
FIG. 2 is a schematic view illustrating a general structure of the liquid discharge apparatus illustrated in FIG. 1.

FIG. 2 is a schematic view illustrating a general structure of a liquid discharge apparatus according to an embodiment. As illustrated in FIG. 2, the liquid discharge apparatus 110 includes four liquid discharge head units 210 (210Y, 210M, 210C, and 210K) to discharge the four inks, respectively.

Each liquid discharge head unit 210 discharges the ink onto the web 120 conveyed in the conveyance direction 10. The liquid discharge apparatus 110 includes two pairs of nip rollers, a roller 230, and the like, to convey the web 120. One of the two pairs of nip rollers is a first nip roller pair NR1 disposed upstream from the liquid discharge head units 210 in the conveyance direction 10. The other is a second nip roller pair NR2 disposed downstream from the first nip roller pair NR1 and the liquid discharge head units 210 in the conveyance direction 10. Each nip roller pair rotates while nipping the conveyed object, such as the web 120, as illustrated in FIG. 2. The nip roller pairs and the roller 230 together serve as a conveyor to convey the conveyed object (e.g., the web 120) in a predetermined direction.

The recording medium such as the web 120 is preferably a long sheet. Specifically, the recording medium is preferably longer than the distance between the first nip roller pair NR1 and the second nip roller pair NR2. The recording medium is not limited to webs. For example, the recording medium can be a folded sheet (so-called fanfold paper or Z-fold paper).

In the structure illustrated in FIG. 2, the liquid discharge head units 210 are arranged in the order of black, cyan, magenta, and yellow in the conveyance direction 10. Specifically, a black liquid discharge head unit 210K is disposed extreme upstream, and a cyan liquid discharge head unit 210C is disposed next to the liquid discharge head unit 210K. Further, a magenta liquid discharge head unit 210M is disposed next to the cyan liquid discharge head unit 210C, and a yellow liquid discharge head unit 210Y is disposed extreme downstream in the conveyance direction 10.

Each liquid discharge head unit 210 discharges the ink to a predetermined position on the web 120, according to image data. The position where the ink lands on the web 120 (hereinafter "landing position") is approximately directly below the position at which the liquid discharge head unit 210 discharges liquid (hereinafter "ink discharge position"). In the description below, the ink discharge position serves as an operation position on the conveyed object, on which the liquid discharge head unit 210 performs processing. Since the position of discharge of liquid to the conveyed object is identical or almost identical to the landing position, which is directly below the head unit, the term "landing position" may be used as the operation position in the descriptions below. In the present embodiment, black ink is discharged to the ink landing position of the liquid discharge head unit 210K (hereinafter "black landing position PK"). Similarly, cyan ink is discharged to the ink landing position of the liquid discharge head unit 210C (hereinafter "cyan landing position PC"). Magenta ink is discharged to the ink landing position of the liquid discharge head unit 210M (hereinafter "magenta landing position PM"). Yellow ink is discharged to the ink landing position of the liquid discharge head unit 210Y (hereinafter "yellow landing position PY"). In the description below, the timing of operation by the head unit is referred to as "operation timing". Specifically, the operation timing of each liquid discharge head units 210 is the timing of discharge of ink by the liquid discharge head units 210. A controller 520 operably connected to the liquid discharge head units 210 controls the respective timings of ink discharge of the liquid discharge head units 210 and actuators AC1, AC2, AC3, and AC4 (hereinafter also collectively "actuators AC"), to move the liquid discharge head units 210. Control of operation timing and the actuators AC are described later.

In the illustrated structure, each liquid discharge head unit 210 is provided with a plurality of rollers. As illustrated in the drawings, for example, the liquid discharge apparatus 110 includes the rollers respectively disposed upstream and downstream from each liquid discharge head unit 210. Specifically, each liquid discharge head unit 210 is provided with one roller (i.e., a first roller) to support the web 120, disposed upstream from the ink landing position and another roller (i.e., a second roller) to support the web 120, disposed downstream from the ink landing position, in the conveyance passage along which the web 120 is conveyed. Disposing the first roller and the second roller for each ink landing position can suppress fluttering of the recording medium conveyed. For example, the first roller and the second roller are disposed along the conveyance passage of the recording medium and, for example, are driven rollers. Alternatively, the first roller and the second roller may be driven by a motor or the like.

Note that, instead of the first and second rollers that are rotators such as driven rollers, first and second supports that are not rotatable to support the conveyed object can be used. For example, each of the first and second supports can be a pipe or a shaft having a round cross section. Alternatively, each of the first and second supports can be a curved plate having an arc-shaped face to contact the conveyed object. In the description below, the first and second supporters are rollers.

Specifically, a first roller CR1K is disposed upstream from the black ink landing position PK in the conveyance direction 10 in which the web 120 is conveyed. A second roller CR2K is disposed downstream from the black ink landing position PK in the conveyance direction 10. Similarly, a first roller CR1C and a second roller CR2C are disposed upstream and downstream from the cyan liquid discharge head unit 210C, respectively. Similarly, a first roller CR1M and a second roller CR2M are disposed upstream and downstream from the liquid discharge head unit 210M, respectively. Similarly, a first roller CR1Y and a second roller CR2Y are disposed upstream and downstream from the liquid discharge head unit 210Y, respectively.

The liquid discharge apparatus 110 includes a sensor device SEN (i.e., a first sensor device) for each of the liquid discharge head units 210, for example, as illustrated in FIG. 2. The term "sensor device" in this specification means a unit including a conveyed object sensor (given reference WS in FIG. 5) to detect a position of the conveyed object in the direction orthogonal to the conveyance direction 10. The conveyed object sensor is a sensor capable of acquiring data of the web 120. The conveyed object sensor can detect the position of the web 120 in the orthogonal direction 20 during image formation. The liquid discharge apparatus 110 can further include another sensor device (i.e., a second sensor device SEN2) upstream from the first sensor devices SEN in the conveyance direction 10. In the example illustrated in FIG. 2, the liquid discharge apparatus 110 includes four first sensor devices and one second sensor device SEN2, that is, five sensor devices in total. In the description below, the first sensor devices and the second sensor device SEN2 may be collectively referred to as "sensor devices SEN". The structure and location of the conveyed object sensor are not limited to those illustrated in the drawings. Alternatively, the second sensor device SEN2 can be omitted.

Although the number of the conveyed object sensors is five in the description below, the number of the conveyed object sensors is not limited to five. Preferably, the number of the conveyed object sensors in total is equal to or greater than the number of the liquid discharge head units. For example, each liquid discharge head unit 210 can be provided with two or greater number of conveyed object sensors. Similarly, two or more second sensor devices SEN2 can be used.

Usable as the conveyed object sensor are a sensor employing laser, air pressure, or ultrasonic; and an optical sensor employing light such as infrared. For example, the optical sensor is a charge-coupled device (CCD) camera or a complementary metal oxide semiconductor (CMOS) camera. Note that the conveyed object sensors can be of same type or different types. In the description below, the conveyed object sensors are of same type.

In the description below, the first sensor device provided for the black liquid discharge head unit 210K is referred to as "sensor device SENK". Similarly, the first sensor device provided for the cyan liquid discharge head unit 210C is referred to as "sensor device SENC". The first sensor device provided for the magenta liquid discharge head unit 210M is referred to as "sensor device SENM". The first sensor device provided for the yellow liquid discharge head unit 210Y is referred to as "sensor device SENY".

Further, the term "location of conveyed object sensor" means the position where data acquisition and the like are performed. Accordingly, it is not necessary that all components relating to the detection are disposed at the "location of conveyed object sensor". In one embodiment, components for functions other than acquisition of data of the web 120 are coupled to the conveyed object sensor via a cable and disposed away therefrom. Note that, references "SENK, SENC, SENM, SENY, and SEN2" are given at respective example locations of conveyed object sensors in the liquid discharge apparatus 110.

For example, the conveyed object sensors of the first sensor devices are preferably disposed in inter-roller ranges INTK1, INTC1, INTM1, and INTY1, respectively. More preferably, the conveyed object sensors are respectively disposed in upstream ranges INTK2, INTC2, INTM2, and INTY2 as illustrated in FIG. 2.

Figure 3:
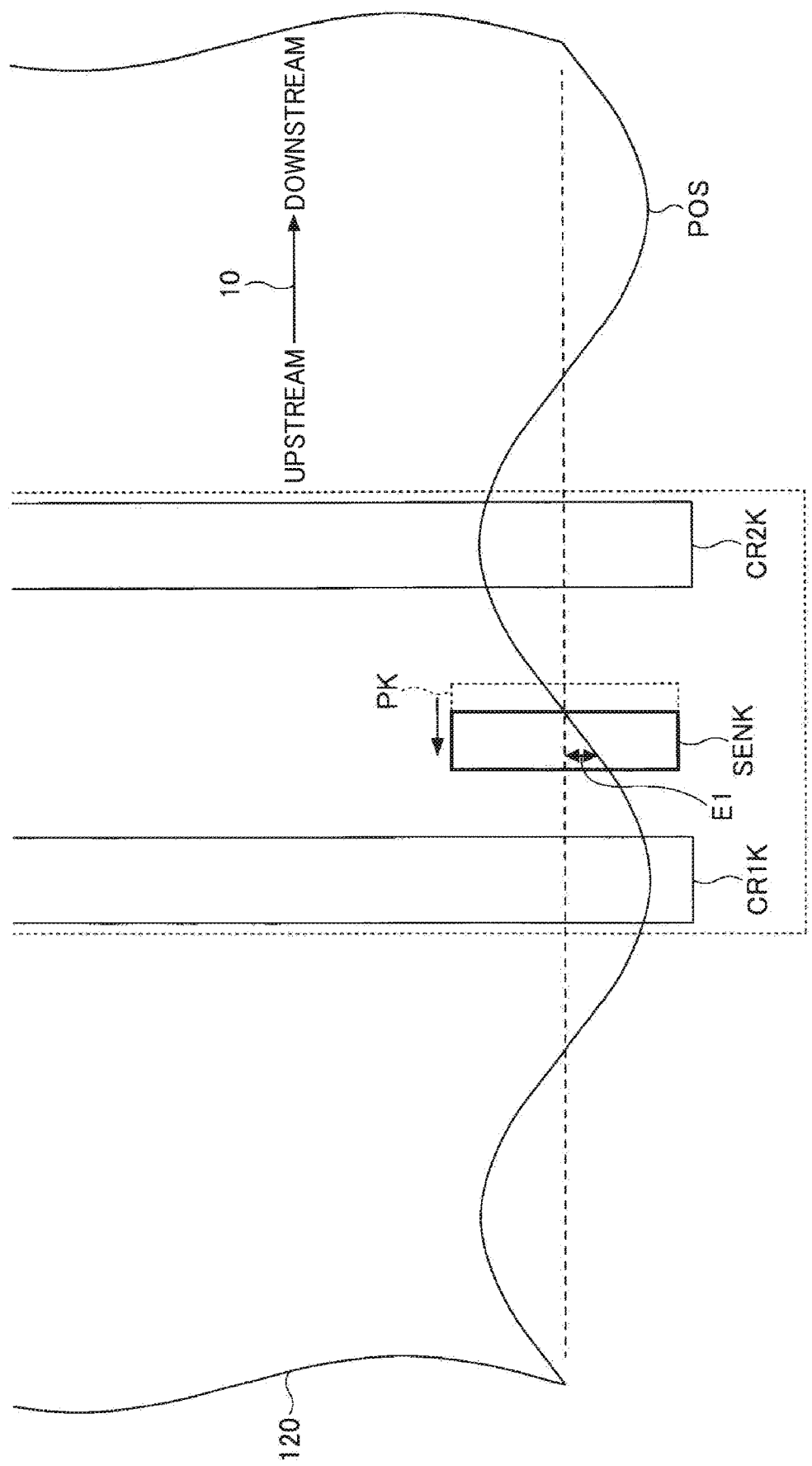
FIG. 3 is a plan view of location of a first sensor device in the liquid discharge apparatus according to an embodiment.

FIG. 3 is a plan view illustrating example location of the first sensor device in the liquid discharge apparatus 110. For example, the sensor device SENK for black is described as an example. In this example, the sensor device SENK for black is disposed between the first roller CR1K and the second roller CR2K, more specifically, shifted closer toward the first roller CR1K from the black landing position PK in the conveyance direction 10 (between the black landing position PK and the first roller CR1K). The distance of the sensor device SENK from the black ink discharge position PK toward the first roller CR1K is determined by the time required for control operation. For example, the sensor device SENK is shifted by 20 mm toward the first roller CR1K. In this case, the sensor device SENK is upstream by 20 mm from the black landing position PK in the conveyance direction 10. Note that, although the sensor device SENK is located at an end POS of the web 120 in FIG. 3 (a center of the sensor device SENK is at a distance E1 from the end POS), the position of the sensor device SEN is not limited thereto, but can be disposed to fully overlap with the web 120 when viewed in a direction perpendicular to the surface of the web 120.

The liquid discharge apparatus 110 can further include a gauge such as an encoder illustrated in FIG. 2. Descriptions are given below of a configuration including an encoder serving as the gauge. For example, the encoder is attached to a rotation shaft of the roller 230, which is a driving roller. Then, the encoder can measure the amount of travel of the web 120 in the conveyance direction 10, based on the amount of rotation of the roller 230. When the measurement results are used in combination with the detection results generated by the conveyed object sensor, the liquid discharge apparatus 110 can discharge ink to the web 120 accurately.

Additionally, the liquid discharge apparatus 110 includes displacement sensor PS (PS1, P2S2, PS3, or PS4) for each head unit to acquire a displacement amount representing the amount by which the head unit has moved in the direction orthogonal to the conveyance direction 10. Specifically, the liquid discharge apparatus 110 includes a first displacement sensor PS1 to detect the displacement amount of the liquid discharge head unit 210K, a second displacement sensor PS2 to detect the displacement amount of the liquid discharge head unit 210C, a third displacement sensor PS3 to detect the displacement amount of the liquid discharge head unit 210M, and a fourth displacement sensor PS4 to detect the displacement amount of the liquid discharge head unit 210Y.

The first, second, third, and fourth displacement sensors PS1, PS2, PS3, and PS4 to detect a displacement amount employ, for example, reflection of laser light or count the number of pulses by slit or linear scale. Alternatively, each of the first, second, third, and fourth displacement sensors PS1, PS2, PS3, and PS4 can be an optical sensor, an accelerometer, an encoder, a potentiometer, a contact image sensor (CIS), or a combination thereof.

The displacement sensor PS is a sensor capable of detecting an amount of displacement of the liquid discharge head unit 210 in the conveyance direction 10, the orthogonal direction 20, or both. The displacement sensor PS can be of any sensor type capable of detecting displacement.

External View of Liquid Discharge Head Unit

Figure 4A:
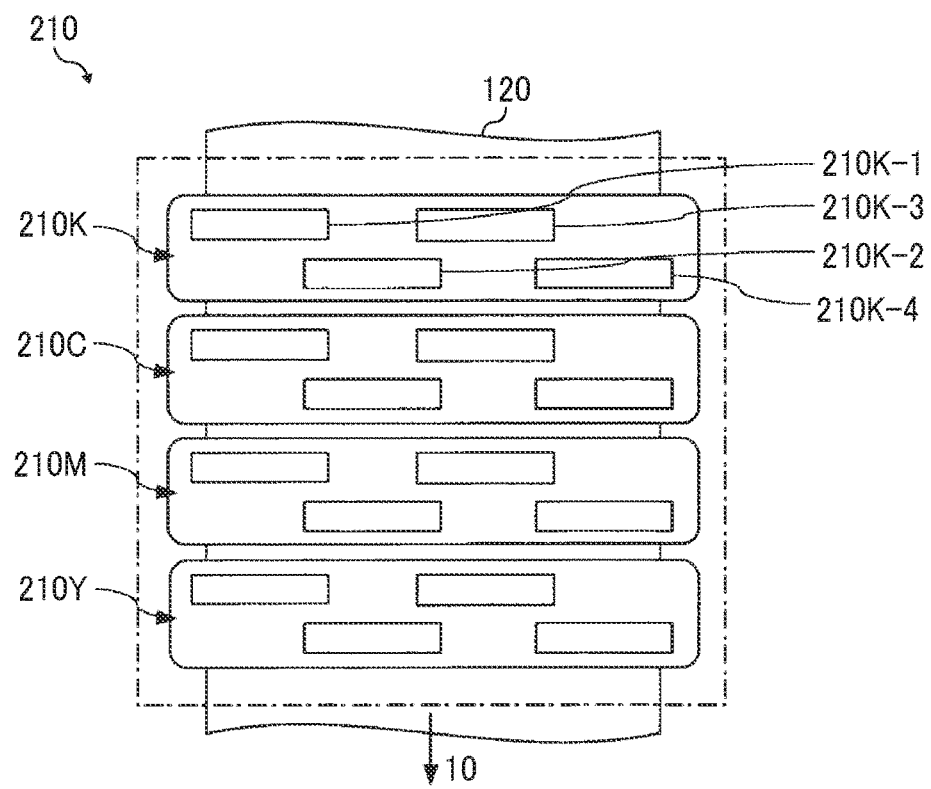
FIGS. 4A and 4B are schematic views illustrating an external shape of a liquid discharge head unit according to an embodiment.
Figure 4B:
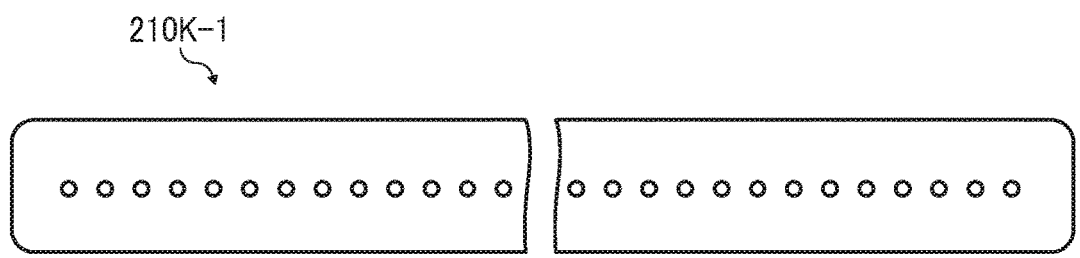

An example outer shape of the liquid discharge head unit 210 is described below with reference to FIGS. 4A and 4B. FIG. 4A is a schematic plan view of one of the four liquid discharge head units 210K, 210C, 210M, and 210Y of the liquid discharge apparatus 110.

As illustrated in FIG. 4A, the liquid discharge head unit 210 according to the present embodiment is a line head unit. That is, the liquid discharge apparatus 110 includes the four liquid discharge head units 210K, 210C, 210M, and 210Y arranged in the order of black, cyan, magenta, and yellow in the conveyance direction 10 of the recording medium.

In this example, the liquid discharge head unit 210K includes four heads 210K-1, 210K-2, 210K-3, and 210K-4 arranged in a staggered manner in the orthogonal direction 20. With this arrangement, the liquid discharge apparatus 110 can form an image across the image formation area on the web 120 in the width direction orthogonal to the conveyance direction 10. The liquid discharge head units 210C, 210M, and 210Y are similar in structure to the liquid discharge head unit 210K, and the descriptions thereof are omitted to avoid redundancy.

Although the liquid discharge head unit 210 includes the four heads in the description above, alternatively, the liquid discharge head unit 210 may be constructed of a single head.

Figure 5:
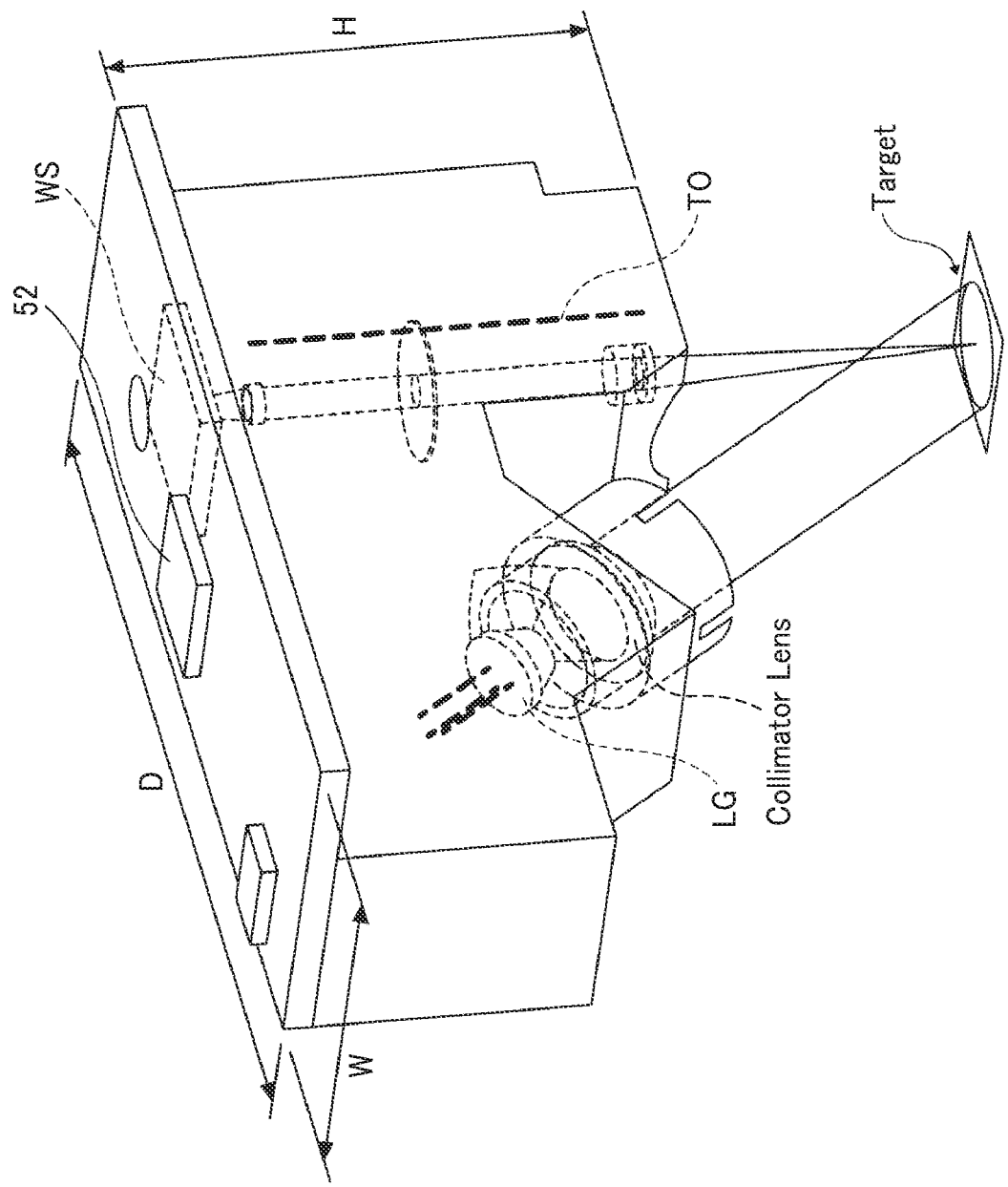
FIG. 5 is an external view of the first sensor device illustrated in FIG. 3.

FIG. 5 is an external view illustrating a structure of the sensor device SEN according to the present embodiment.

The sensor device SEN illustrated in this drawing is configured to irradiate a conveyed object, such as the web 120, with light to form a speckle pattern. Specifically, the sensor device SEN includes a light source LG such as a semiconductor laser light source (e.g., a laser diode or LD) and an optical system such as a collimate lens (CL). To acquire an image of the speckle pattern, the sensor device SEN includes the conveyed object sensor WS that is a CMOS image sensor and a telecentric optics (TO) to condense light to image the speckle pattern on the image sensor. The speckle pattern is described later.

In the illustrated structure, the CMOS image sensors (the conveyed object sensor WS) of different sensor devices SEN capture the image of the speckle pattern, for example, at a time TM1 and a time TM2, respectively. Alternatively, the same CMOS image sensor can capture the speckle pattern at the time TM1 and the time TM2. In the illustrated example, the sensor device SEN has a width W of 15 mm, a depth D of 60 mm, and a height H of 32 mm (15×60×32).

As described above, the CMOS image sensor is one example of the conveyed object sensor WS, and a control circuit 52 is one example of an imaging controller 14 to be described later. The control circuit 52 is, for example, a field-programmable gate array (FPGA). The light source is not limited to laser light sources but can be, for example, a light emitting diode (LED) or an organic electro luminescence (EL). Depending on the type of light source, the pattern to be detected is not limited to the speckle pattern.

Figure 6:
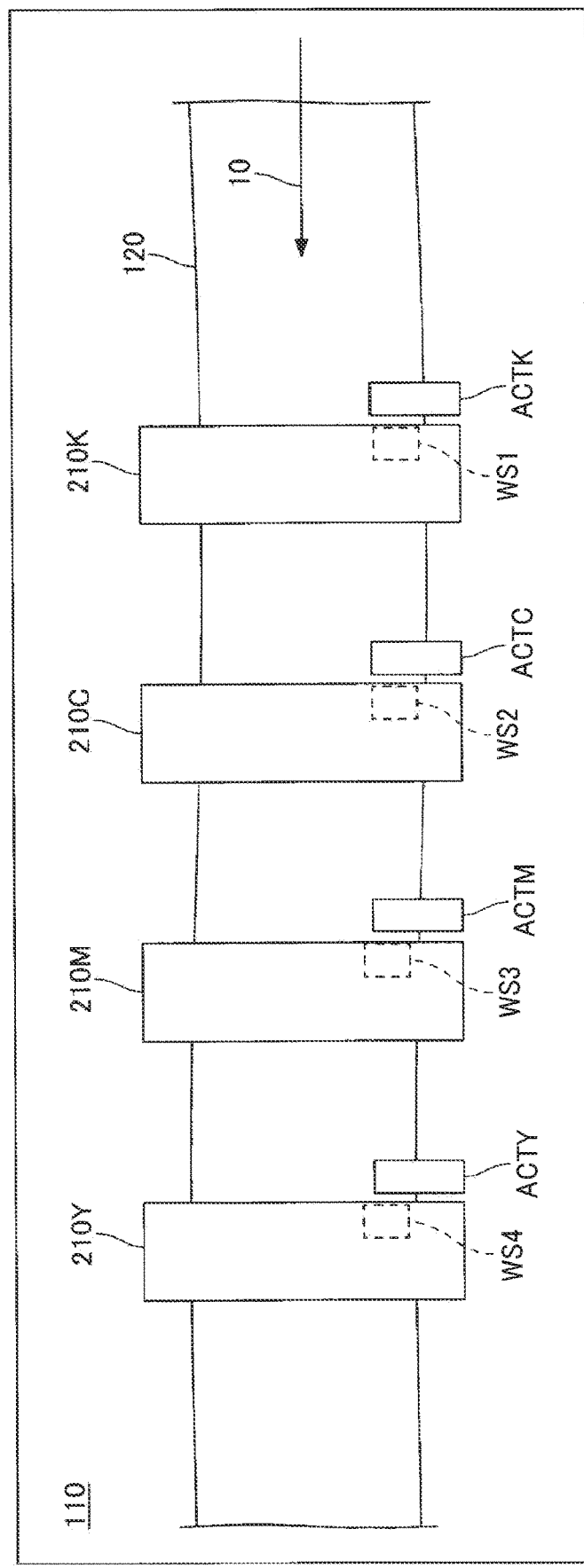
FIG. 6 is a plan view illustrating an example arrangement of conveyed object sensors of the liquid discharge apparatus illustrated in FIG. 2.

FIG. 6 is a plan view illustrating an example arrangement of conveyed object sensors WS illustrated in FIG. 5. For example, the conveyed object sensor WS of the sensor device SENK is referred to as a first conveyed object sensor WS1. Similarly, the conveyed object sensors WS of the sensor devices SENC, SENM, and SENY are referred to as second, third, and fourth conveyed object sensors WS2, WS3, and WS4, respectively. The first, second, third, and fourth conveyed object sensors WS1, WS2, WS3, and WS4 are disposed to detect the web 120 as illustrated in FIG. 6.

In the example illustrated in FIG. 5, preferably, the sensor device SEN is disposes so that the detection area of the conveyed object sensor WS overlaps, at least partly, the web 120 when projected in the direction perpendicular to the surface of the web 120. The respective actuators AC1, AC2, AC3, and AC4 of the liquid discharge head units 210 in FIG. 6 are described later. Note that, in a configuration where the liquid discharge head unit 210K is not moved in the direction orthogonal to the conveyance direction 10, the first actuator AC1 can be omitted.

Figure 7:
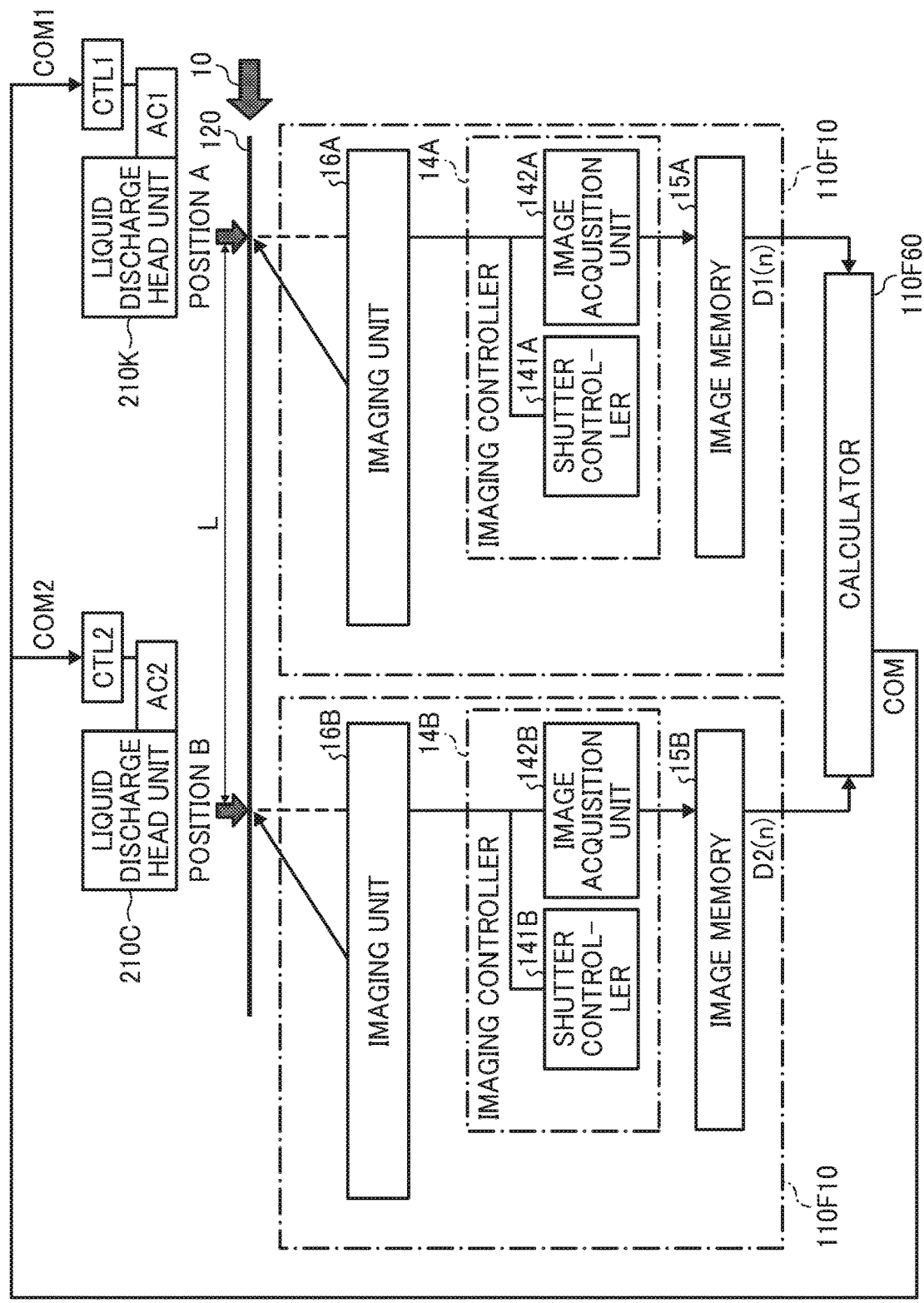
FIG. 7 is a schematic functional block diagram to calculate a detection result according to an embodiment.

FIG. 7 is a schematic block diagram of a functional configuration according to an embodiment. Descriptions below are based on a combination of the liquid discharge head units 210K and 210C, of the sensor devices SEN respectively provided for the liquid discharge head units 210. The sensor device SEN is hardware having the function of a detecting unit 110F10 illustrated in FIG. 7.

In this example, the detecting unit 110F10 for the liquid discharge head unit 210K outputs data concerning the position A, and the detecting unit 110F10 for the liquid discharge head unit 210C outputs data concerning the position B. The detecting unit 110F10 for the liquid discharge head unit 210K includes, for example, an imaging unit 16A, an imaging controller 14A, and an image memory 15A. In this example, the detecting unit 110F10 for the liquid discharge head unit 210C is similar in configuration to the detecting unit 110F10 for black and includes an imaging unit 16B, an imaging controller 14B, and an image memory 15B. The detecting unit 110F10 concerning the position A is described below.

The imaging unit 16A captures an image of the web 120 conveyed in the conveyance direction 10. The imaging unit 16A is implemented by, for example, the conveyed object sensor WS (illustrated in FIG. 5).

The imaging controller 14A includes a shutter controller 141A and an image acquisition unit 142A. The imaging controller 14A is implemented by, for example, the control circuit 52 (illustrated in FIG. 5).

The image acquisition unit 142A captures the image generated by the imaging unit 16A.

The shutter controller 141A controls the timing of imaging by the imaging unit 16A.

The image memory 15A stores the image acquired by the imaging controller 14A. The image memory 15A is implemented by, for example, a memory and the like.

A calculator 110F60 is configured to calculate, based on the images respectively recorded in the image memories 15A and 15B, the position of a pattern on the web 120, the speed at which the web 120 is conveyed (hereinafter "travel speed"), and the amount by which the web 120 is conveyed (hereinafter "travel amount"). In the present embodiment, the calculator 110F60 calculate a command value COM to drive each actuator AC based on the result of calculation. Details are to be described later. The calculator 110F60 outputs, to the shutter controllers 141A and 141B, data on time difference Δt indicating the timing of shooting (shutter timing). In other words, the calculator 110F60 instructs the shutter controller 141A of shutter timings of imaging at the position A and imaging at the position B with the time difference Δt. The calculator 110F60 is implemented by, for example, the controller 520 illustrated in FIG. 2 and the like.

The web 120 has diffusiveness on a surface thereof or in an interior thereof. Accordingly, when the web 120 is irradiated with light (e.g., laser beam), the reflected light is diffused. The diffuse reflection creates a pattern on the web 120. The pattern is made of spots called "speckles" (i.e., a speckle pattern). Accordingly, when the web 120 is shot, an image of the speckle pattern is acquired. From the image, the position of the speckle pattern is known, and the location of a specific portion of the web 120 can be detected. The speckle pattern is generated as the light emitted to the web 120 interferes with a rugged shape caused by a projection and a recess, on the surface or inside of the web 120.

As the web 120 is conveyed, the speckle pattern on the web 120 is conveyed as well. When an identical speckle pattern is detected at different time points, the amount of travel of the speckle pattern is acquired. In other words, the calculator 110F60 obtains the amount of travel of the speckle pattern based on the detection of an identical speckle pattern, thereby obtaining the amount of travel of the web 120. Further, the calculator 110F60 converts the calculated amount of travel into an amount of travel per unit time, thereby obtain the speed at which the web 120 has moved. The amount of travel and speed of travel of the web 120 acquired are not limited to those in the conveyance direction 10. Since the imaging unit 16A outputs two-dimensional image data, the calculator 110F60 can calculate the amount or speed of two-dimensional movement. The sensor device SEN may be shared for detecting a position in the conveyance direction 10 and detecting a position in the orthogonal direction 20. Sharing the sensor in detecting positions in both directions can reduce the cost. Additionally, the space for the detection can be small since the number of sensors is reduced.

Then, based on the speckle pattern, the liquid discharge apparatus 110 can obtain a detection result indicating the position of the web 120 in the orthogonal direction 20, with a high accuracy.

The calculator 110F60 is configured to calculate the position, speed of travel, amount of travel, or combination thereof of the web 120 using the correlation operation described below.

Example of Correlation Operation

Figure 8:
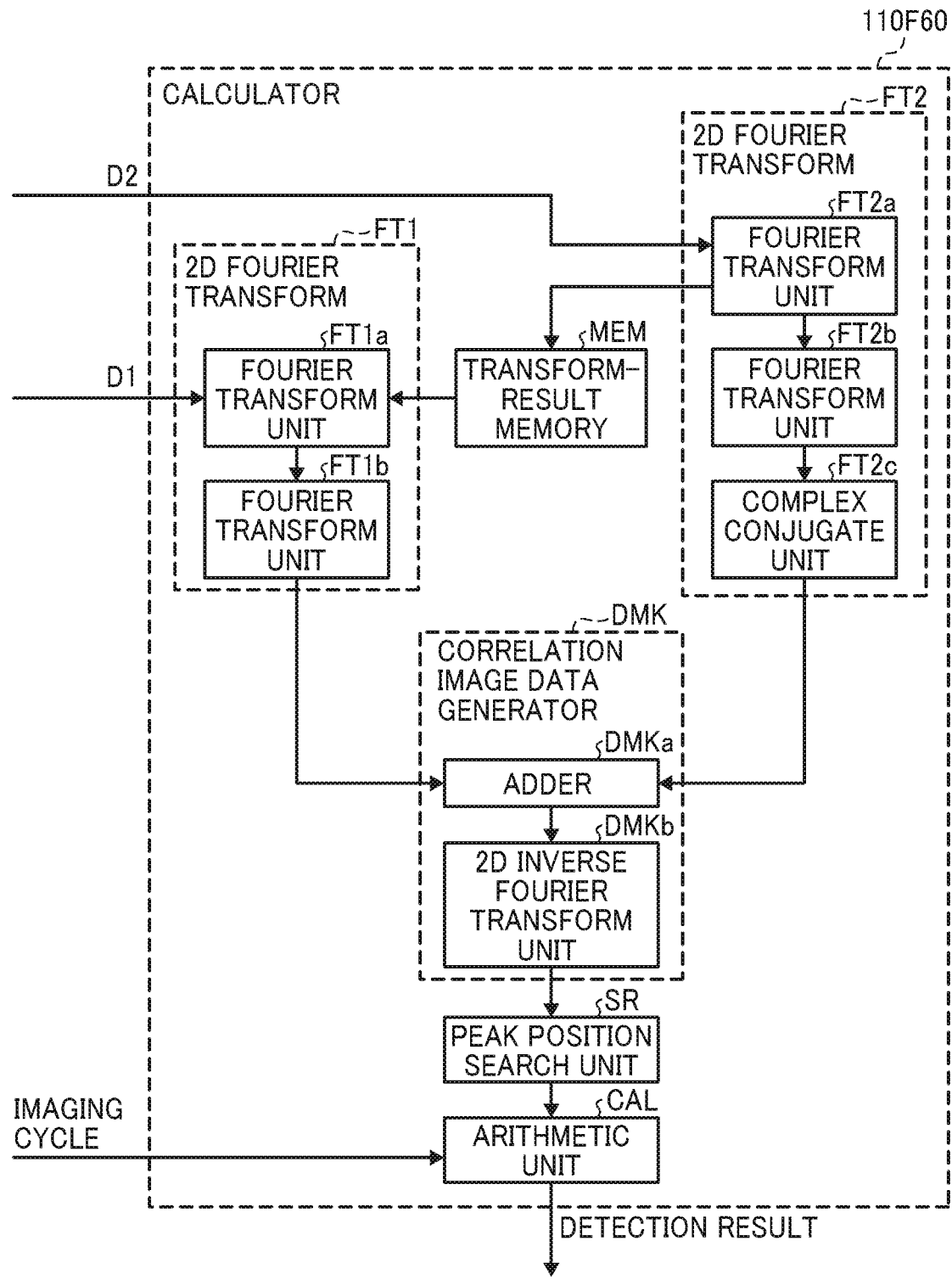
FIG. 8 is a diagram of a method of correlation operation according to an embodiment.

FIG. 8 is a diagram of a configuration for the correlation operation according to the present embodiment. For example, the calculator 110F60 performs the correlation operation with the illustrated configuration, to calculate the relative position of the web 120 in the orthogonal direction at the position where the image data is obtained, the amount of travel, speed of travel, or a combination thereof. With the correlation operation, the amount of displacement of the web 120 from the ideal position at the timing when the image data is obtained and the speed of travel can be calculated.

Specifically, the calculator 110F60 includes a 2D Fourier transform FT1 (a first 2D Fourier transform), a 2D Fourier transform FT2 (second 2D Fourier transform), a correlation image data generator DMK, a peak position search unit SR, an arithmetic unit CAL (or arithmetic logical unit), and a transform-result memory MEM.

The 2D Fourier transform FT1 is configured to transform the first image data D1. The 2D Fourier transform FT1 includes a Fourier transform unit FT1$a$ for transform in the orthogonal direction 20 and a Fourier transform unit FT1$b$ for transform in the conveyance direction 10.

The Fourier transform unit FT1$a$ performs one-dimensional transform of the first image data D1 in the orthogonal direction 20. Based on the result of transform by the Fourier transform unit FT1$a$ for orthogonal direction, the Fourier transform unit FT1$b$ performs one-dimensional transform of the first image data D1 in the conveyance direction 10. Thus, the Fourier transform unit FT1$a$ and the Fourier transform unit FT1$b$ perform one-dimensional transform in the orthogonal direction 20 and the conveyance direction 10, respectively. The 2D Fourier transform FT1 outputs the result of transform to the correlation image data generator DMK.

Similarly, the 2D Fourier transform FT2 is configured to transform the second image data D2. The 2D Fourier transform FT2 includes a Fourier transform unit FT2*a* for transform in the orthogonal direction 20, a Fourier transform unit FT2*b* for transform in the conveyance direction 10, and a complex conjugate unit FT2*c*.

The Fourier transform unit FT2*a* performs one-dimensional transform of the second image data D2 in the orthogonal direction 20. Based on the result of transform by the Fourier transform unit FT2*a* for orthogonal direction, the Fourier transform unit FT2*b* performs one-dimensional transform of the second image data D2 in the conveyance direction 10. Thus, the Fourier transform unit FT2*a* and the Fourier transform unit FT2*b* perform one-dimensional transform in the orthogonal direction 20 and the conveyance direction 10, respectively.

Subsequently, the complex conjugate unit FT2*c* calculates a complex conjugate of the results of transform by the Fourier transform unit FT2*a* (for orthogonal direction) and the Fourier transform unit FT2*b* (for conveyance direction). Then, the 2D Fourier transform FT2 outputs, to the correlation image data generator DMK, the complex conjugate calculated by the complex conjugate unit FT2*c*.

The correlation image data generator DMK then generates the correlation image data, based on the transform result of the first image data D1, output from the 2D Fourier transform FT1, and the transform result of the second image data D2, output from the 2D Fourier transform FT2.

The correlation image data generator DMK includes an adder DMKa and a 2D inverse Fourier transform unit DMKb.

The adder DMKa adds the transform result of the first image data D1 to that of the second image data D2 and outputs the result of addition to the 2D inverse Fourier transform unit DMKb.

The 2D inverse Fourier transform unit DMKb performs 2D inverse Fourier transform of the result generated by the adder DMKa. Thus, the correlation image data is generated through 2D inverse Fourier transform. The 2D inverse Fourier transform unit DMKb outputs the correlation image data to the peak position search unit SR.

The peak position search unit SR searches the correlation image data for a peak position (a peak luminance or peak value), at which rising is sharpest. To the correlation image data, values indicating the intensity of light, that is, the degree of luminance, are input. The luminance values are input in matrix.

Note that, in the correlation image data, the luminance values are arranged at a pixel pitch of the conveyed object sensor WS (i.e., an area sensor), that is, pixel size intervals. Accordingly, the peak position is preferably searched for after performing so-called sub-pixel processing. Sub-pixel processing enhances the accuracy in searching for the peak position. Then, the calculator 110F60 can output the position, the amount of travel, and the speed of travel.

Figure 9:
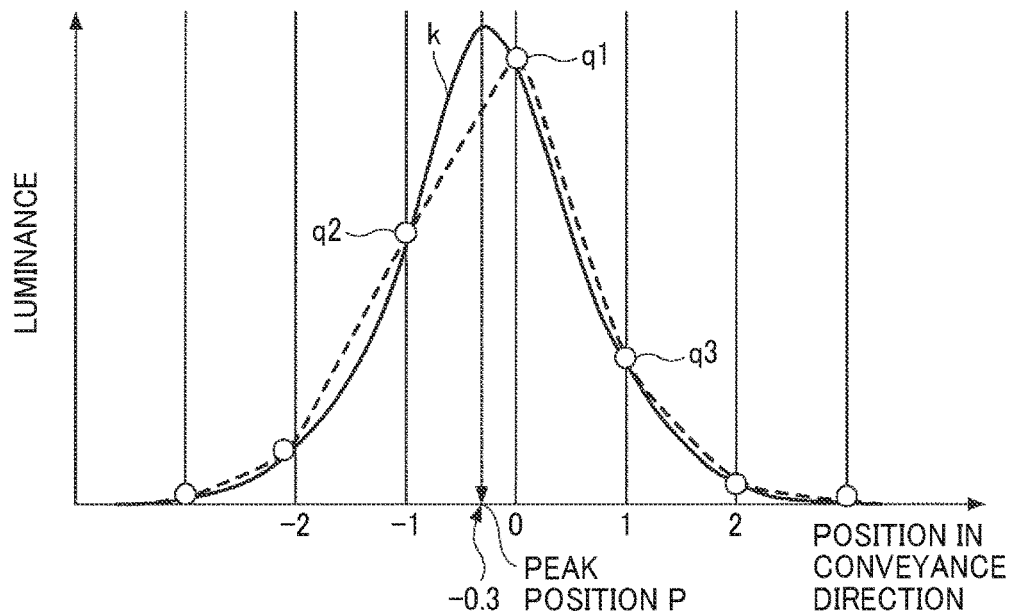
FIG. 9 is a graph for understanding of a peak position searched in the correlation operation.

An example of searching by the peak position search unit SR is illustrated in FIG. 9.

FIG. 9 is a graph illustrating the peak position searched in the correlation operation according to the present embodiment. In this graph, the lateral axis represents the position in the conveyance direction 10 of an image represented by the correlation image data, and the vertical axis represents the luminance values of the image represented by the correlation image data.

The luminance values indicated by the correlation image data are described below using a first data value q1, a second data value q2, and a third data value q3. In this example, the peak position search unit SR (illustrated in FIG. 8) searches for a peak position P on a curved line k connecting the first, second, and third data values q1, q2, and q3.

Initially, the peak position search unit SR calculates each difference between the luminance values indicated by the correlation image data. Then, the peak position search unit SR extracts a largest difference combination, meaning a combination of luminance values between which the difference is largest among the calculated differences. Then, the peak position search unit SR extracts combinations of luminance values adjacent to the largest difference combination. Thus, the peak position search unit SR can extract three data values, such as the first, second, and third data values q1, q2, and q3 in the graph. The peak position search unit SR calculates the curved line K connecting these three data values, thereby acquiring the peak position P. In this manner, the peak position search unit SR can reduce the amount of operation such as sub-pixel processing to increase the speed of searching for the peak position P. The position of the combination of luminance values between which the difference is largest means the position at which rising is sharpest. The manner of sub-pixel processing is not limited to the description above.

Figure 10:
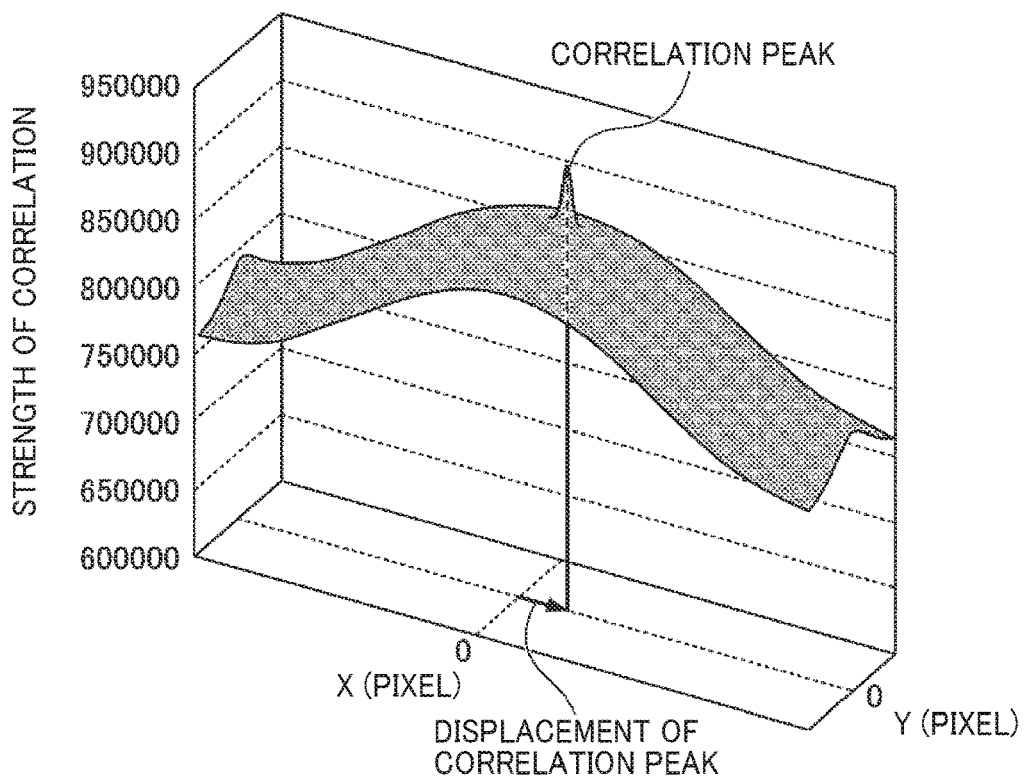
FIG. 10 is a diagram of example results of the correlation operation.

Through the searching of the peak position P performed by the peak position search unit SR, for example, the result illustrated in FIG. 10 is attained.

FIG. 10 is a diagram of example results of correlation operation and illustrates a profile of strength of correlation of a correlation function. In the drawing, X axis and Y axis represent serial number of pixel. The peak position search unit SR (illustrated in FIG. 8) searches for a peak position such as "correlation peak" in the graph.

The arithmetic unit CAL (in FIG. 8) calculates the relative position, amount of travel, or speed of travel of the web 120, or a combination thereof. For example, the arithmetic unit CAL calculates the difference between a center position of the correlation image data and the peak position calculated by the peak position search unit SR, to acquire the relative position and the amount of travel.

For example, the arithmetic unit CAL divides the amount of travel by time, to acquire the speed of travel.

Thus, the calculator 110F60 can calculate, through the correlation operation, the relative position, amount of travel, or speed of travel of the web 120. Although the description above concerns a case where fluctuations are present in Y direction, the peak position occurs at a position displaced in the X direction when there are fluctuations in the X direction. The methods of calculation of the relative position, the amount of travel, or the speed of travel are not limited to those described above. For example, alternatively, the calculator 110F60 obtains the relative position, amount of travel, or speed of travel through the following method.

Initially, the calculator 110F60 binarizes each luminance value of the first image data D1 and the second image data D2. That is, the calculator 110F60 binarizes a luminance value not greater than a predetermined threshold into "0" and a luminance value greater than the threshold into "1". Then, the calculator 110F60 may compare the binarized first and second image data D1 and D2 to obtain the relative position.

Alternatively, the calculator 110F60 can adapt a different method to obtain the relative position, amount of travel, or speed of travel. For example, the calculator 110F60 can adapt so-called pattern matching processing to detect the relative position based on a pattern taken in the image data.

Figure 11A:
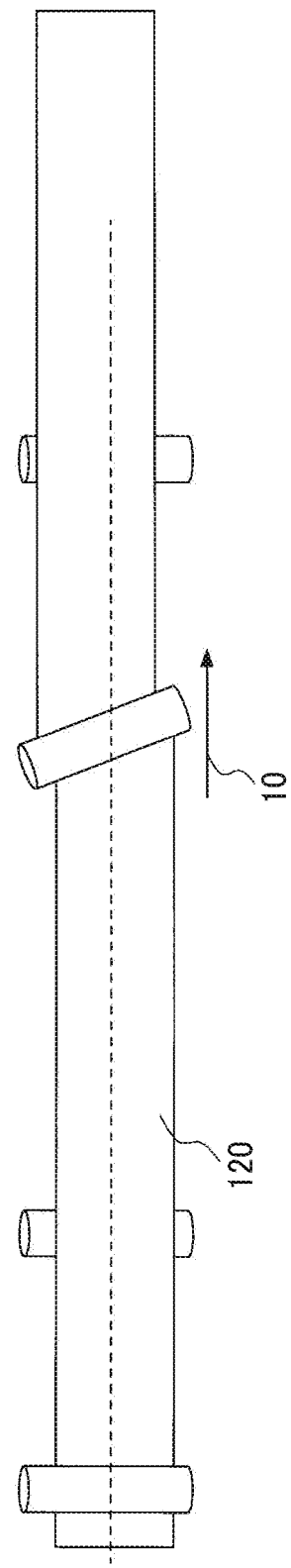
FIGS. 11A and 11B are plan views of a recording medium being conveyed.
Figure 11B:
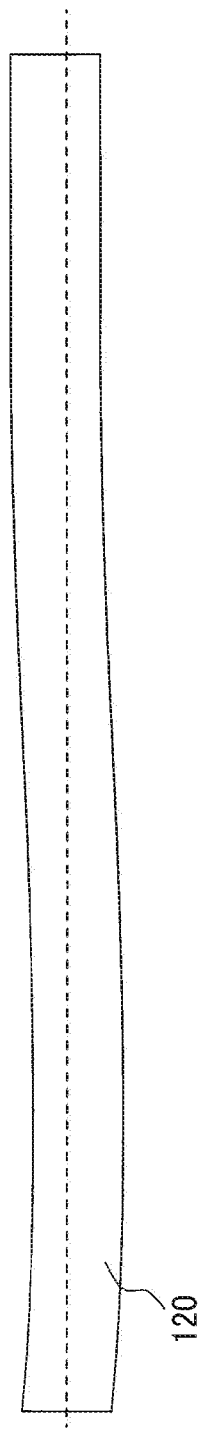

Descriptions are given below of displacement of the recording medium in the orthogonal direction 20, with reference to FIGS. 11A and 11B, which are plan views of the web 120 being conveyed. In FIG. 11A, the web 120 is conveyed in the conveyance direction 10. While the web 120 is conveyed by the rollers (such as the rollers 230, CR1, and CR2 in FIG. 2), the position of the web 120 may fluctuate in the orthogonal direction 20 as illustrated in FIG. 11B. That is, the web 120 may meander as illustrated in FIG. 11B.

Note that, the roller is disposed oblique to the conveyance direction 10 in the illustrated example. In the drawing, the obliqueness is exaggerated, and the degree of obliqueness may be smaller than the degree illustrated.

The fluctuation of the position of the web 120 in the orthogonal direction 20 (hereinafter "orthogonal position of the web 120"), that is, the meandering of the web 120, is caused by eccentricity of a conveyance roller (the driving roller in particular), misalignment, or tearing of the web 120 by a blade. When the web 120 is relatively narrow in the orthogonal direction 20, for example, thermal expansion of the roller affects fluctuation of the web 120 in the orthogonal position.

For example, when vibration is caused by eccentricity of the roller or cutting with a blade, the web 120 can meander as illustrated. Additionally, when the cutting with the blade is uneven, meandering can be also caused by a physical property of the web 120, that is, the shape of the web 120 after the cutting.

Figure 12:
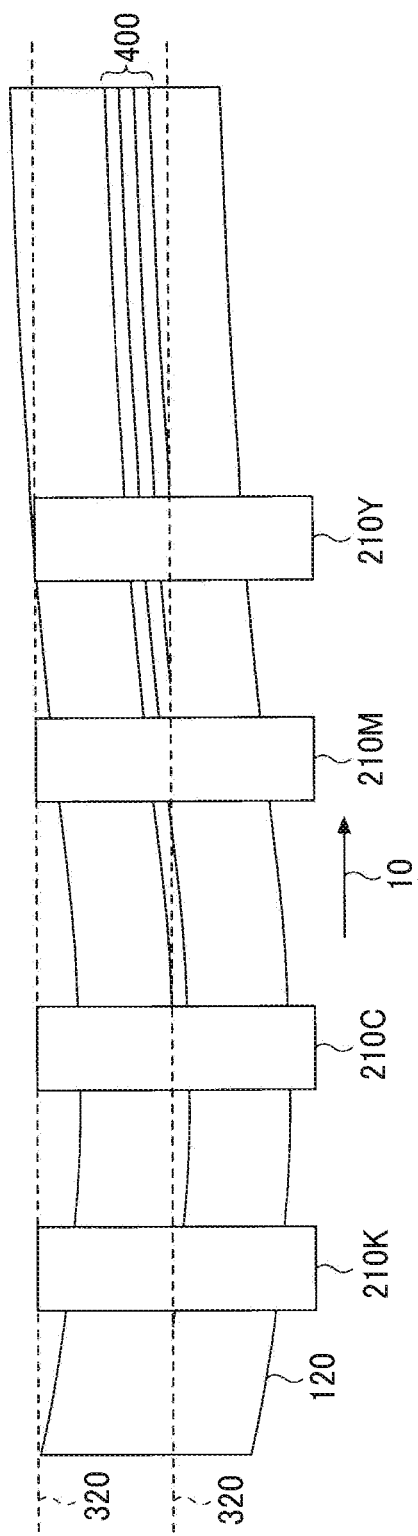
FIG. 12 is a plan view of the recording medium being conveyed and illustrates creation of an image out of color registration.

Descriptions are given below of a cause of misalignment in color superimposition (out of color registration) with reference to FIG. 12. Due to fluctuations (meandering illustrated in FIG. 11B) of the web 120 (the recording medium) in the orthogonal direction 20, misalignment in color superimposition is likely to occur as illustrated in FIG. 12.

Specifically, to form a multicolor image on a recording medium using a plurality of colors, the liquid discharge apparatus 110 superimposes a plurality of different color inks discharged from the liquid discharge head units 210, through so-called color plane, on the web 120.

As illustrated in FIG. 11B, the web 120 can fluctuate in position and meanders, for example, with reference to lines 320. Assuming that the liquid discharge head units 210 discharge respective inks to an identical portion (i.e., an intended droplet landing position) on the web 120 in this state, a portion 400 out of color registration is created since the intended droplet landing position fluctuates in the orthogonal direction 20 while the web 120 meanders between the liquid discharge head units 210. The portion 400 out of color registration is creased as the position of a line or the like, drawn by the respective inks discharged from the liquid discharge head units 210, shakes in the orthogonal direction 20. The portion 400 out of color registration degrades the quality of the image on the web 120.

In response to the displacement in the orthogonal direction 20, the actuators AC1, AC2, AC3, and AC4 respectively provided for the liquid discharge head units 210 move the liquid discharge head units 210.

Figure 13:
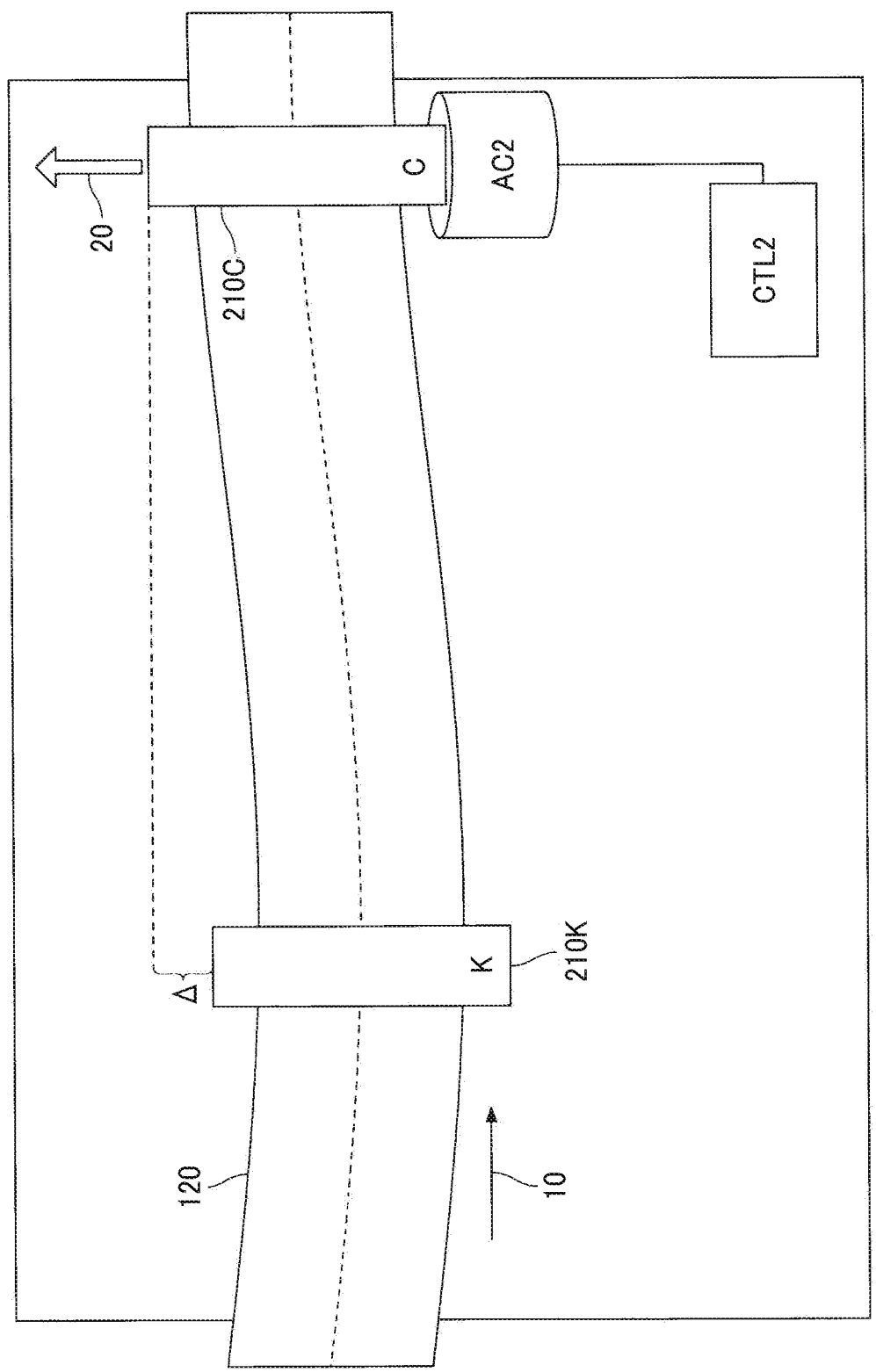
FIG. 13 is a schematic diagram of an example mechanism to move the liquid discharge head unit of the liquid discharge apparatus, according to an embodiment.

FIG. 13 is a schematic diagram of an example hardware to move the liquid discharge head unit 210 according to the present embodiment. In the drawing, the mechanism to move the liquid discharge head unit 210C is illustrated.

In the illustrated example, the second actuator AC2 such as a linear actuator is coupled to the liquid discharge head unit 210C to move the liquid discharge head unit 210C. To the second actuator AC2, an actuator controller CTL2 to control the second actuator AC2 is connected.

The actuator AC2 is, for example, a linear actuator or a motor. The actuator AC2 can include a control circuit, a power circuit, and a mechanical component. Specifically, for example, the second actuator AC2 converts rotation of a servo motor or the like into a linear motion with a ball screw and the like.

To the actuator controller CTL2, the command value COM or a corrected command value COM' calculated based on the detection result (e.g., displacement of the web 120) generated by the calculator 110F60 (in FIG. 7) is input. The actuator controller CTL2 drives the second actuator AC2 to move the liquid discharge head unit 210C based on the position indicated by the command value COM or the corrected command value COM', to compensate for the displacement of the web 120 indicated by the detection result. In FIG. 13, the liquid discharge head unit 210C is moved by an amount A. The actuator controller CTL2 is described in detail later.

Figure 14:
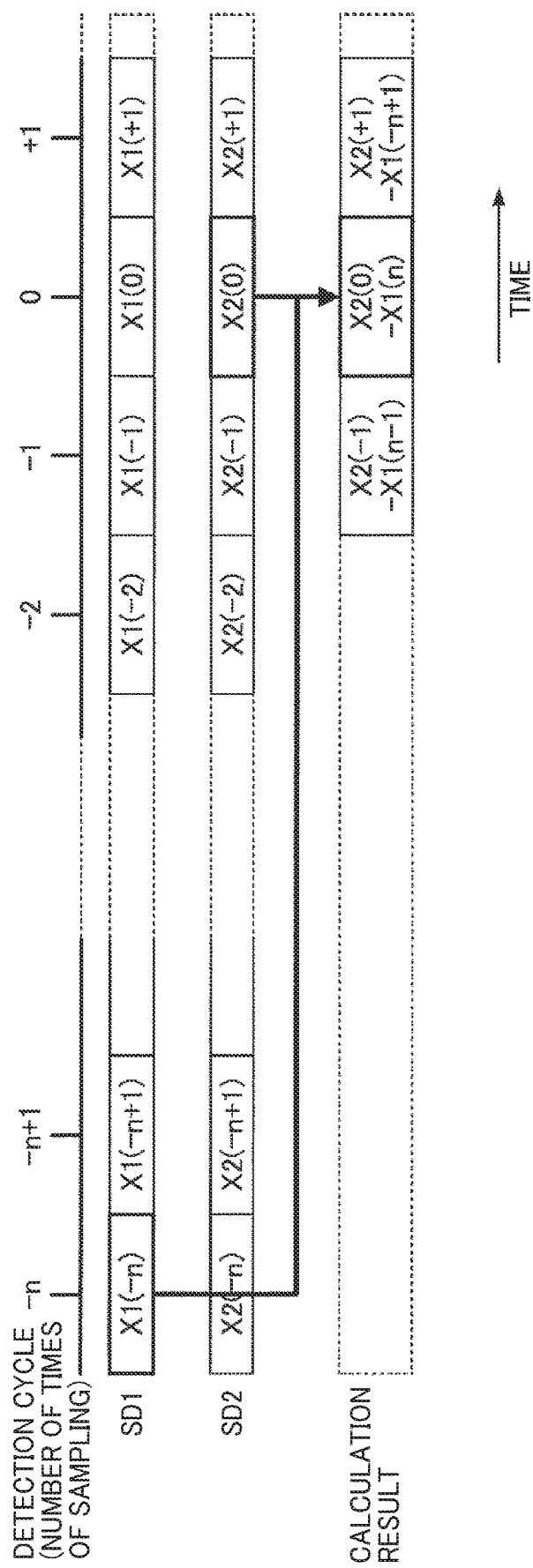
FIG. 14 is a timing chart of calculation of the amount of displacement of a conveyed object, according to an embodiment.

FIG. 14 is a timing chart of calculation of the amount of displacement of the conveyed object, performed by the liquid discharge apparatus 110 according to the present embodiment. As illustrated in the drawing, the calculator 110F60 (illustrated in FIG. 7) calculates the amount of displacement of the web 120 based on a plurality of sensor data. Specifically, the calculator 110F60 outputs the result of calculation indicating the displacement based on first and second sensor data SD1 and SD2. The first and second sensor data SD1 and SD2 are data output from any two of the first sensor devices (sensor devices SENK, SENC, SENM, and SENY) and the second device sensor SEN2 illustrated in FIG. 2. Subsequently, based on the sensor data, the calculator 110F60 calculates the displacement amount of the web 120.

The amount of displacement is calculated for each liquid discharge head unit 210. Descriptions are given below of calculation of displacement of the web 120 for adjusting the cyan liquid discharge head unit 210C (illustrated in FIG. 2). In this example, the displacement of the web 120 is calculated based on the sensor data generated by the sensor device SENC (illustrated in FIG. 2) and that by the sensor device SENK disposed upstream from and next to the sensor device SENC. In this example, the first sensor data SD1 is generated by the sensor device SENK, and the second sensor data SD2 is generated by the sensor device SENC.

It is assumed that L (representing distance between imaging positions in FIG. 7) represents the distance between the sensor device SENK and the sensor device SENC (sensor interval), V represents the conveyance speed of travel of the web 120, detected by a speed detection circuit SCR described later, and T2 represents a travel time for the web 120 (conveyed object) to be conveyed from the sensor device SENK to the sensor device SENC. In this case, the time T2 is calculated as "T2=L/V".

Further, when A represents a sampling interval of the sensors and n represents the number of times of sampling performed while the web 120 travels from the sensor device SENK to the sensor device SENC, the number of times of sampling "n" is calculated as "n=T2/A".

The calculation result is referred to as a displacement ΔX. For example, in a case of a detection cycle "0" in the timing chart, the first sensor data SD1 before the travel time T2 is compared with the second sensor data SD2 at the detection cycle "0", to calculate the displacement ΔX of the web 120. This calculation is expressed as ΔX=X2(0)−X1(n). In the arrangement in which the location of the sensor is shifted from the landing position closer toward the first roller CR1, the calculator 110F60 calculates the amount by which the position of the conveyed object (e.g., a recording medium) is expected to change till the conveyed object reaches the sensor WS. Then, the calculator 110F60 outputs the command value COM. The command value COM is for compensating the displacement ΔX.

Subsequently, the actuator controller CTL2 controls the second actuator AC2 illustrated in FIG. 13 based on the command value COM to move the liquid discharge head unit 210C illustrated in FIG. 2 in the orthogonal direction 20. With this operation, even when the position of the conveyed object changes in the orthogonal direction 20, the liquid discharge apparatus 110 can form an image on the conveyed object with a high accuracy. Further, as the position change is calculated based on the two sensor data, that is, the data generated by the two different sensors, the position change of the conveyed object can be calculated without multiplying the position data of the sensors. This operation can suppress the accumulation of detection errors by the sensors.

The amount of position change of the web 120 can be calculated similarly for other liquid discharge head units 210. For example, the position change of the web 120 for adjusting the black liquid discharge head unit 210K (illustrated in FIG. 2) is calculated using the first sensor data SD1 generated by the second sensor device SEN2 and the second sensor data SD2 generated by the sensor device SENK. The position change of the web 120 for adjusting the magenta liquid discharge head unit 210M is calculated using the first sensor data SD1 generated by the sensor device SENC and the second sensor data SD2 generated by the sensor device SENM. The position change of the web 120 for adjusting the yellow liquid discharge head unit 210Y is calculated using the first sensor data SD1 generated by the sensor device SENM and the second sensor data SD2 generated by the sensor device SENY.

The conveyed object sensor WS to output the first sensor data SD1 is not limited to the conveyed object sensor WS of the sensor device SEN next to and upstream from the liquid discharge head unit 210 to be moved. That is, the first sensor data SD1 can be generated by any of the conveyed object sensors WS disposed upstream from the liquid discharge head unit 210 to be moved. The sensor data output by any one of the second sensor device SEN2 and the sensor devices SENK and SENC can be used as the first sensor data SD1 to calculate the displacement of the web 120 for adjusting the yellow liquid discharge head unit 210Y.

By contrast, the second sensor data SD2 is preferably generated by the conveyed object sensors WS closest to the liquid discharge head unit 210 to be moved.

Alternatively, the displacement of the conveyed object can be calculated based on three or more detection results.

Thus, the calculator 110F60 calculates the command value COM based on the displacement of the web 120 calculated from a plurality of sensor data. Then, the actuator controller CTL2 moves the liquid discharge head unit 210 based on the command value COM. Then, the liquid is discharged onto the web 120 (i.e., the recording medium) to form an image thereon.

The controller 520 illustrated in FIG. 2 is described below.

Figure 15:
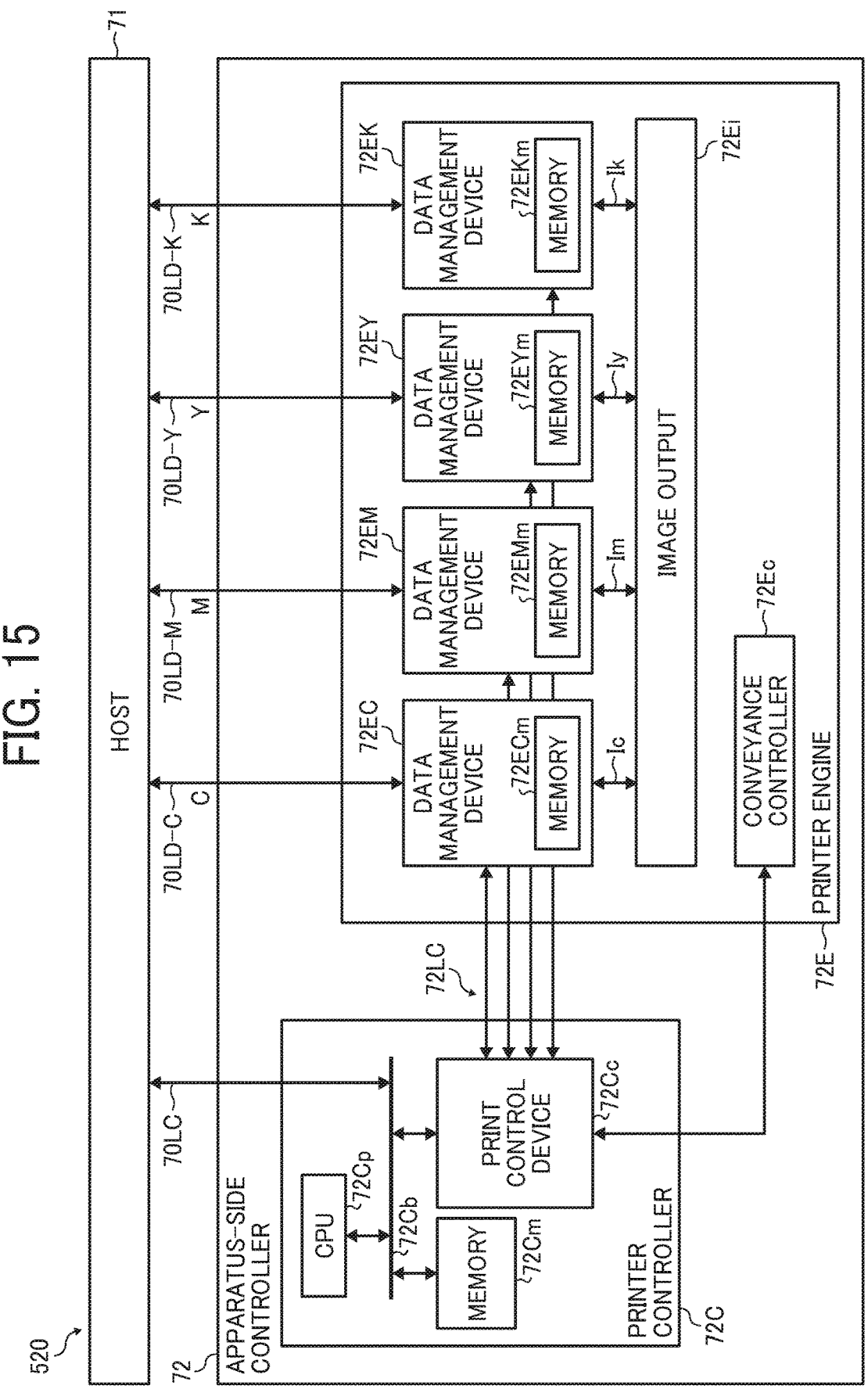
FIG. 15 is a block diagram of a control for the liquid discharge apparatus according to an embodiment.

FIG. 15 is a schematic block diagram of a hardware configuration of a controller according to an embodiment. For example, the controller 520 includes a host 71 (or a higher-order device), such as an information processing apparatus, and an apparatus-side controller 72. In the illustrated example, the controller 520 causes the apparatus-side controller 72 to form an image on a recording medium according to image data and control data input to the host 71.

Examples of the host 71 include a client computer (personal computer or PC) and a server. The apparatus-side controller 72 includes a printer controller 72C and a printer engine 72E.

The printer controller 72C governs operation of the printer engine 72E. The printer controller 72C transmits and receives the control data to and from the host 71 via a control line 70LC. The printer controller 72C further transmits and receives the control data to and from the printer engine 72E via a control line 72LC. Through such data transmission and reception, the control data indicating printing conditions and the like are input to the printer controller 72C. The printer controller 72C stores the printing conditions, for example, in a resistor. The printer controller 72C then controls the printer engine 72E according to the control data to form an image based on print job data, that is, the control data.

The printer controller 72C includes a central processing unit (CPU) 72Cp, a print control device 72Cc, and a memory 72Cm. The CPU 72Cp and the print control device 72Cc are connected to each other via a bus 72Cb to communicate with each other. The bus 72Cb is connected to the control line 70LC via a communication interface (I/F) or the like.

The CPU 72Cp controls the entire apparatus-side controller 72 based on a control program and the like. That is, the CPU 72Cp is a processor as well as a controller.

The print control device 72Cc transmits and receives data indicating a command or status to and from the printer engine 72E, based on the control date transmitted from the host 71. Thus, the print control device 72Cc controls the printer engine 72E. The calculator 110F60 illustrated in FIG. 8 is implemented by, for example, the CPU 72Cp. Alternatively, the calculator 110F60 can be implemented by another processor and another memory.

To the printer engine 72E, a plurality of data lines, namely, data lines 70LD-C, 70LD-M, 70LD-Y, and 70LD-K are connected. The printer engine 72E receives the image data from the host 71 via the plurality of data lines. Then, the printer engine 72E performs image formation of respective colors, controlled by the printer controller 72C.

The printer engine 72E includes a plurality of data management devices, namely, data management devices 72EC, 72EM, 72EY, and 72EK respectively including memory 72ECm, 72EMm, 72EYm, and 72EKm. The printer engine 72E includes an image output 72Ei and a conveyance controller 72Ec.

Figure 16:
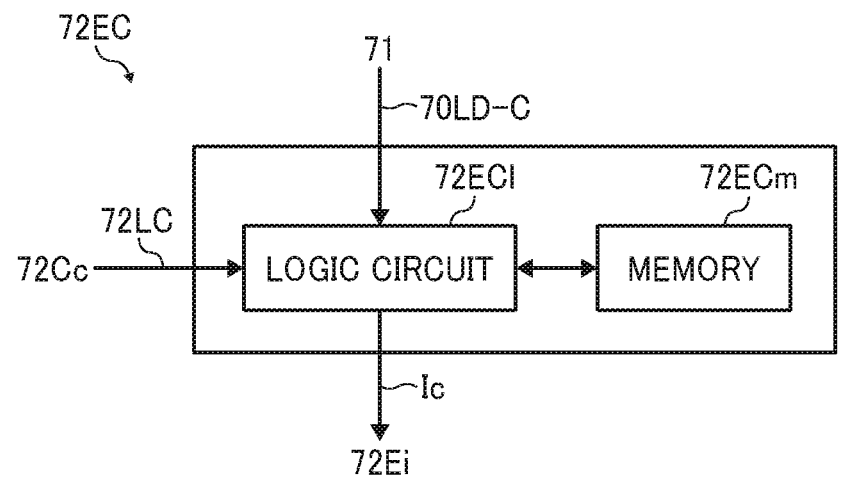
FIG. 16 is a block diagram of a hardware configuration of a data management device of the controller illustrated in FIG. 15.

FIG. 16 is a block diagram of a configuration of a data management device. For example, the plurality of data management devices 72EC, 72EM, 72EY, and 72EK can have an identical configuration, and the data management device 72EC is described below as a representative. Redundant descriptions are omitted.

The data management device 72EC includes a logic circuit 72ECl and a memory 72ECm. As illustrated in FIG. 15, the logic circuit 72ECl is connected via a data line 70LD-C to the host 71. The logic circuit 72ECl is connected via the control line 72LC to the print control device 72Cc. The logic circuit 72ECl is implemented by, for example, an application specific integrated circuit (ASIC) or a programmable logic device (PLD).

According to a control signal input from the printer controller 72C (illustrated in FIG. 15), the logic circuit 72ECl stores, in the memory 72ECm, the image data input from the host 71.

According to a control signal input from the printer controller 72C, the logic circuit 72ECl retrieves, from the memory 72ECm, cyan image data Ic. The logic circuit 72ECl then transmits the cyan image data Ic to the image output 72Ei. Similarly, magenta image data Im, yellow image data Iy, and black image data Ik are transmitted to the image output 72Ei.

The memory 72ECm preferably has a capacity to store image data extending about three pages. With the capacity to store image data extending about three pages, the memory 72ECm can store the image data input from the host 71, data image being used current image formation, and image data for subsequent image formation.

Figure 17:
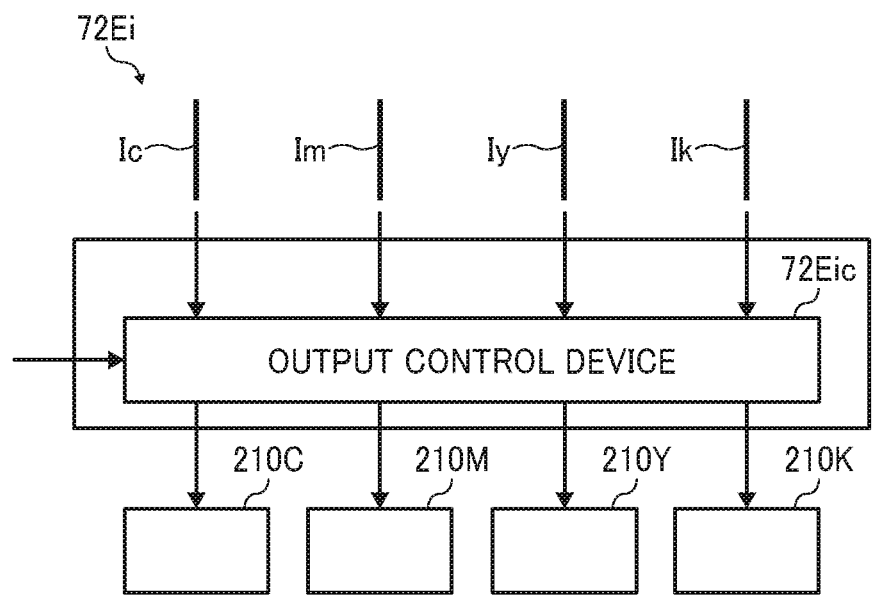
FIG. 17 is a block diagram of a hardware configuration of an image output device of the controller illustrated in FIG. 15.

FIG. 17 is a block diagram of a configuration of the image output 72Ei. In this block diagram, the image output 72Ei includes an output control device 72Eic and controls the liquid discharge head units 210K, 210C, 210M, and 210Y.

The output control device 72Eic outputs the image data for respective colors to the liquid discharge head units 210. That is, the output control device 72Eic controls the liquid discharge head units 210 based on the image data input thereto.

The output control device 72Eic controls the plurality of liquid discharge head units 210 either simultaneously or individually. That is, the output control device 72Eic receives timing commands and changes the timings at which the liquid discharge head units 210 discharge respective color inks. The output control device 72Eic can control one or more of the liquid discharge head units 210 based on the control signal input from the printer controller 72C (illustrated in FIG. 15). Alternatively, the output control device 72Eic can control one or more of the liquid discharge head units 210 based on user instructions.

In the example illustrated in FIG. 15, the apparatus-side controller 72 has different routes for inputting the image data from the host 71 and for transmission and reception of control data, with the host 71 and the apparatus-side controller 72.

The apparatus-side controller 72 may instruct formation of single-color images using one color ink, for example, black ink. In the case of single-color image formation using black ink, to accelerate image formation speed, the liquid discharge apparatus 110 can include one data management device (the data management devices 72EC, 72EM, 72EY, or 72EK) and four black liquid discharge head units 210. In such as configuration, the plurality of black liquid discharge head units 210K discharge black ink. Accordingly, the image formation speed is faster than that in the configuration using one black liquid discharge head unit 210K.

The conveyance controller 72Ec (in FIG. 15) includes a motor and the like to convey the web 120. For example, the conveyance controller 72Ec controls the motor coupled to the rollers to convey the web 120.

Example of Position Adjustment of Head Unit

Figure 18:
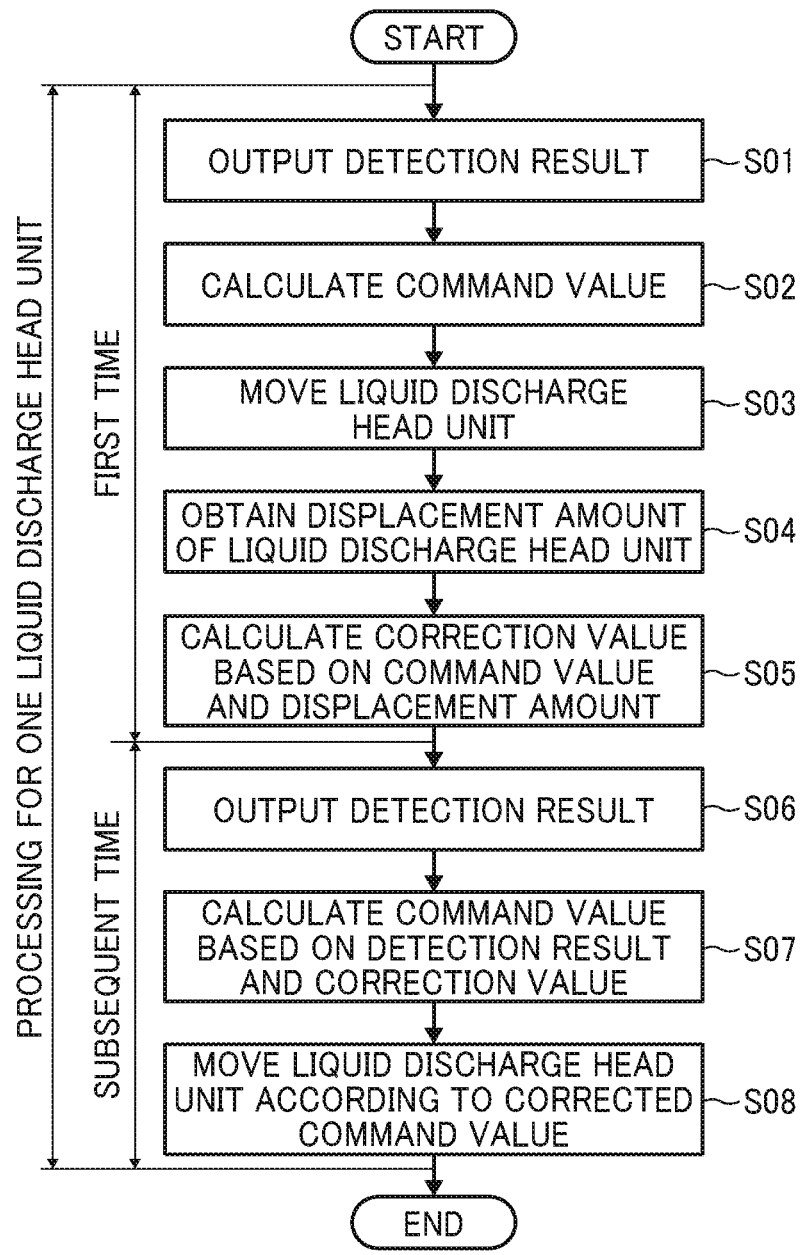
FIG. 18 is a flowchart of operation performed by the liquid discharge apparatus, according to an embodiment.

FIG. 18 is a flowchart of position adjustment of the liquid discharge head unit 210. For example, image data representing an image to be formed on the web 120 (illustrated in FIG. 1) is preliminarily input to the liquid discharge apparatus 110. Then, the liquid discharge apparatus 110 performs the process illustrated in FIG. 18 and forms the image on the web 120 according to the image data.

The process illustrated in FIG. 18 relates to one liquid discharge head unit 210. The description below concerns the position adjustment of the liquid discharge head unit 210K. For the liquid discharge head unit 210 of another color, the process illustrated in FIG. 18 is performed in parallel or at a different timing.

At S01, the calculator 110F60 calculates a detection result representing at least one of a position, a speed of travel, and an amount of travel of the conveyed object. In other words, the liquid discharge apparatus 110 calculates the displacement of the conveyed object illustrated in FIG. 11B based on the data output by the plurality of conveyed object sensors WS.

Specifically, at S01, the liquid discharge apparatus 110 initially generates, with the conveyed object sensors WS, the data of the web 120. Then, the liquid discharge apparatus 110 acquires the sensor data respectively output from the conveyed object sensors WS. Subsequently, the liquid discharge apparatus 110 calculates the detection result representing the relative position of the conveyed object (recording medium) or the amount of displacement thereof based on the plurality of sensor data. For example, the displacement amount is calculated as illustrated in FIG. 14.

At S02, the calculator 110F60 calculates the command value based on the detection result. The command value is input to each actuator controller CTL to control the travel of the liquid discharge head unit 210.

At S03, the liquid discharge apparatus 110 moves the liquid discharge head unit 210, for example, using the mechanism illustrated in FIG. 13.

At S04, the liquid discharge apparatus 110 obtains a displacement amount of each liquid discharge head unit 210 representing the amount by which the liquid discharge head unit 210 has moved under the control by the actuator controller CTL, for example, using the displacement sensor illustrated in FIG. 2.

Figure 19:
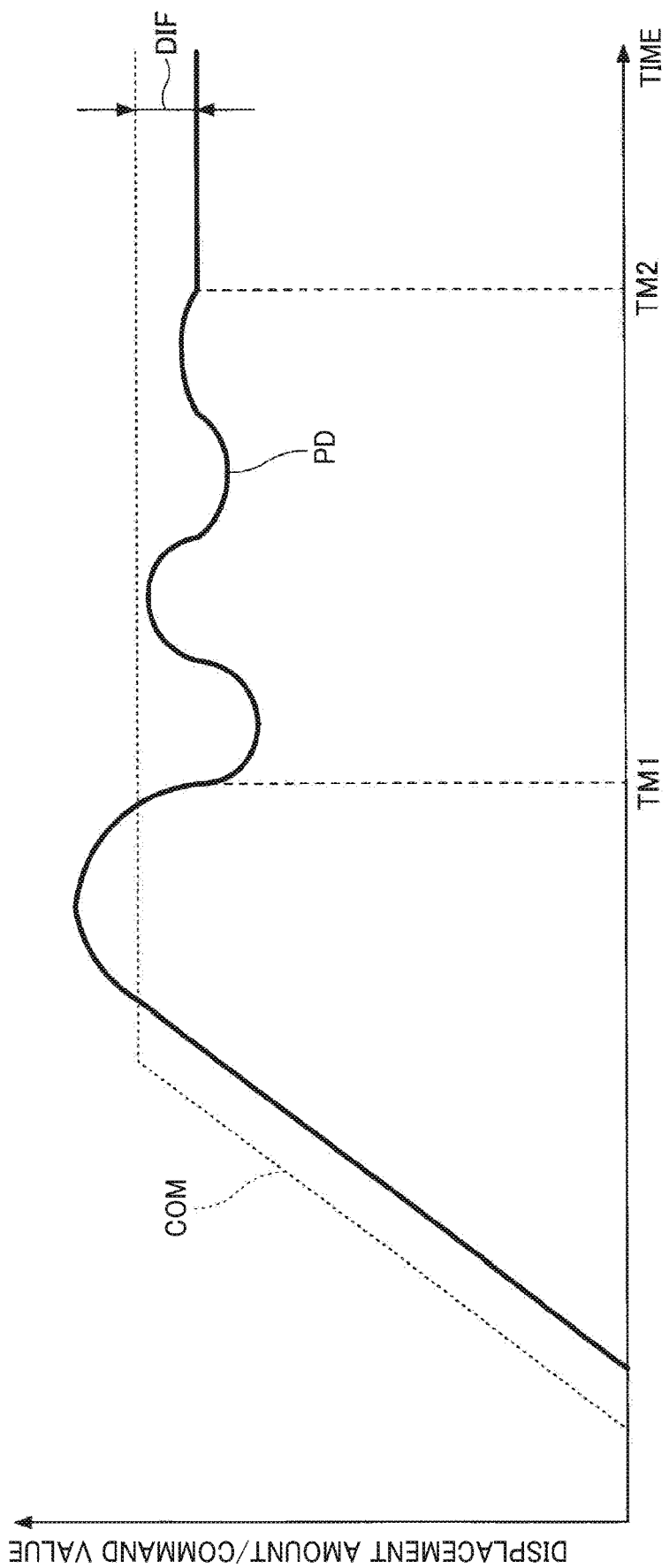
FIG. 19 is a chart illustrating a relation between a displacement amount and a command value in travel control of the liquid discharge head unit, according to an embodiment.

At S05, the liquid discharge apparatus 110 calculates a correction value CO (illustrated in FIG. 20) based on a difference DIF (illustrated in FIG. 12) between the command value and the displacement amount of the liquid discharge head unit 210. Such calculation is to be described in detail later. As illustrated in FIG. 19, a displacement amount PD of the head unit is compared with the command value COM to calculate the difference DIF between the command value and the displacement amount.

FIG. 19 is a chart illustrating a relation between a displacement amount of the liquid discharge head unit 210 and a command value instructing the travel of the liquid discharge head unit 210. In this drawing, the lateral axis represents time, and the vertical axis represents the command value COM and the value of the displacement amount PD, relative to time. The command value COM corresponds to one of the liquid discharge head units 210, and the displacement amount PD is a value output from the displacement sensor PS detecting the displacement of the corresponding head unit.

As illustrated, there is the difference DIF between the command value COM and the displacement amount PD. While the command value COM changes ideally, delay in phase and oscillation are inherent to the displacement amount PD. The oscillation settles after elapse of a settling time from when the liquid discharge head unit 210 is moved. Then, the displacement amount PD is settled at a value different by the difference DIF from the command value.

Specifically, to obtain the difference DIF, after the settling time has elapsed (after a second time TM2 in FIG. 19), the displacement amount is obtained once or a plurality of times (at S04), and the difference between the obtained displacement amount PD (or the average of the obtained displacement amounts PD) and the command value COM is calculated.

Alternatively, to calculate the difference DIF, the displacement amount can be obtained at a plurality of times in a period, for example, from the first time TM1 to the second time TM2. That is, initially, in a time from the first time TM1 to the second time TM2, the displacement amount is obtained once or a plurality of times (at S04). Then, the liquid discharge apparatus 110 calculates the difference between the obtained value (or the average of the obtained values) and the command value COM, as the difference DIF.

Further, when the displacement amount PD accompanies oscillation, as illustrated in FIG. 19, the difference DIF can be calculated as follows. The liquid discharge apparatus 110 obtains the displacement amounts PD of the liquid discharge head unit 210 a plurality of times within a time equivalent to an integral multiple of the oscillation period (S04) and calculates an average of the displacement amounts to obtain the difference DIF. Alternatively, the difference DIF can be calculated from approximation of the displacement amounts PD.

Additionally, in the case of the oscillation as illustrated in FIG. 19, the liquid discharge apparatus 110 damps the oscillation with low-pass filter or the like. After the filtering, the liquid discharge apparatus 110 can obtain the displacement amount PD once or a plurality of times (S04) and calculate the difference DIF between the average of the obtained value (or the average of the obtained values) and the command value COM.

The difference DIF between the command value COM and the displacement amount PD can be calculated, for example, for each predetermined control period.

At S06, similar to S01, the liquid discharge apparatus 110 calculates the detection result (position, speed of travel, or travel amount of the conveyed object). Based on the detection result, the command value COM is calculated. Subsequently, the command value COM is input to a correction circuit CRCO illustrated in FIG. 20.

At S07, the correction circuit CRCO calculates the corrected command value COM' based on the command value COM and the correction value CO. That is, the liquid discharge apparatus 110 calculates the displacement amount PD as illustrated in FIG. 14. Then, the command value COM to move the liquid discharge head unit 210 to compensate for the displacement (e.g., meandering) of the web 120 is calculated.

At S08, the liquid discharge apparatus 110 corrects the command value COM and controls the position of the liquid discharge head unit 210 according to the corrected command value COM'. The correction circuit CRCO (illustrated in FIG. 20) corrects the command value COM calculated at S07 and outputs the corrected command value COM' to the actuator controller CTL. With this processing, the actuator AC is controlled according to the corrected command value COM'.

Figure 20:
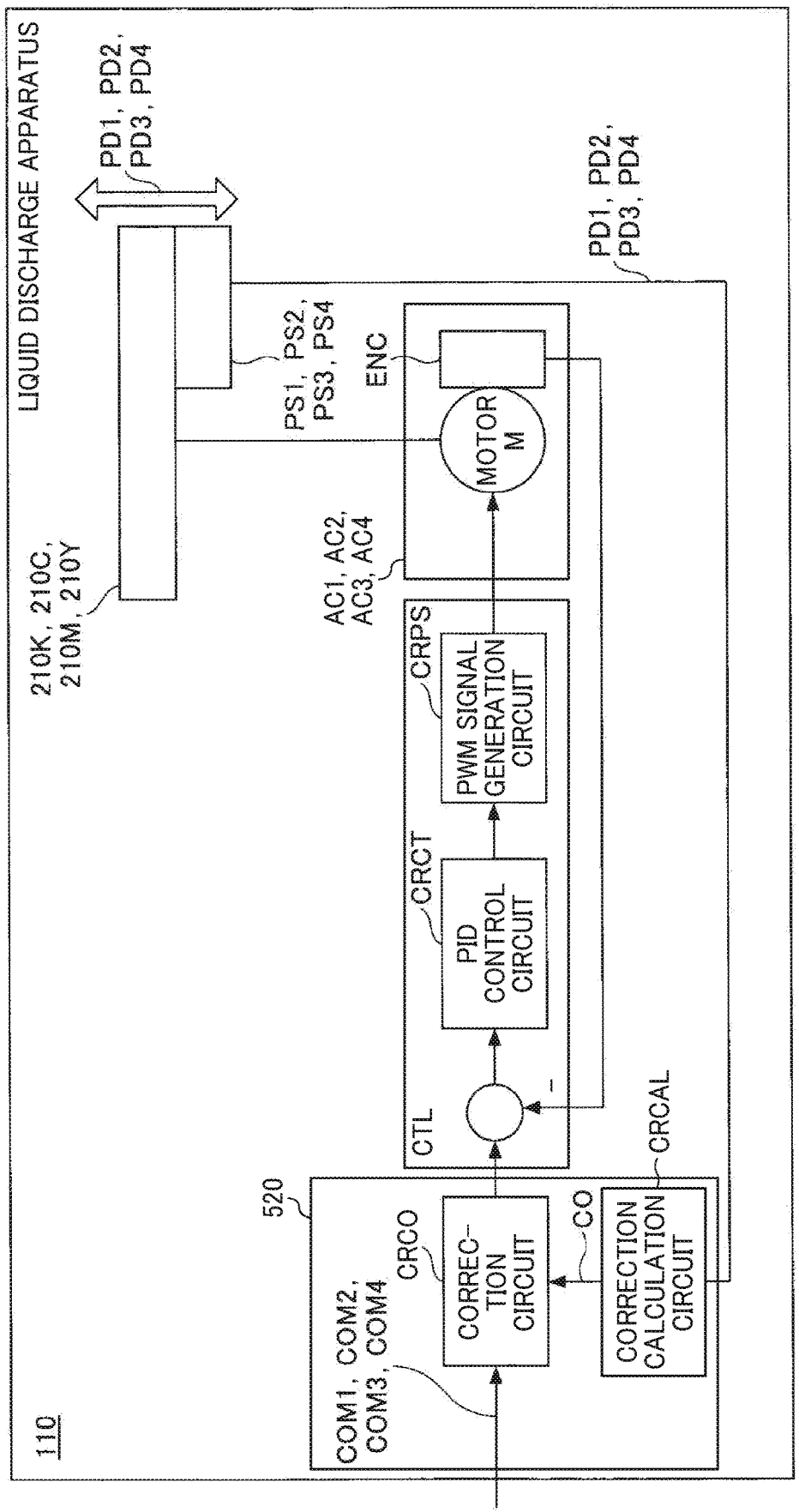
FIG. 20 is a control block diagram to move the liquid discharge head unit according to one embodiment.

FIG. 20 is an example control block diagram to move the liquid discharge head unit 210 according to the present embodiment. FIG. 20 is a control black diagram to operate one liquid discharge head unit 210. For example, the control black illustrated in FIG. 20 moves the liquid discharge head unit 210 with the hardware such as the controller 520, the actuator AC, and the actuator controller CTL.

In FIG. 20, the actuator AC (AC1, AC2, AC3, or AC4) includes a motor M and an encoder ENC. The motor M drives the liquid discharge head unit 210. The encoder ENC detects the rotation angle of the motor M. The actuator controller CTL includes a pulse-width modulation (PWM) signal generation circuit CRPS and a proportional integral derivation (PID) control circuit CRCT.

To the motor M, the PWM signal generation circuit CRPS inputs a PWM signal. According to the PWM signal, the motor M rotates.

To each liquid discharge head unit 210, the displacement sensor PS is coupled. The displacement sensor PS measures the amount by which the liquid discharge head unit 210 has moved. The first, second, third, and fourth displacement amounts PD1, PD2, PD3, and PD4 (correctively "displacement amounts PD") respectively measured by the first, second, third, and fourth displacement sensors PS1, PS2, PS3, and PS4 (correctively "PS") are output to the correction calculation circuit CRCAL.

The correction circuit CRCO and the correction calculation circuit CRCAL are functions of the controller 520. The correction calculation circuit CRCAL calculates the correction value CO based on the command value COM and the displacement amount PD. The correction value CO is for compensating the difference DIF between the command value COM and the displacement amount PD.

The correction circuit CRCO calculates the corrected command value COM' based on the command value COM calculated as illustrated in FIG. 14 and the correction value CO calculated by the correction calculation circuit CRCAL. The corrected command value COM' is output to the PID control circuit CRCT. When the command value COM is not corrected, the correction circuit CRCO outputs the command value COM as is to the subsequent step.

The PID control circuit CRCT and the PWM signal generation circuit CRPS are functions of the actuator controller CTL. Receiving the command value, the PID control circuit CRCT generates a speed profile, which is, for example, a trapezoidal waveform or triangular waveform, and outputs the profile to the PWM signal generation circuit CRPS. As illustrated, to the PID control circuit CRCT, a value detected by the encoder ENC is fed back. A feedback period, that is, servo cycle time of the motor is, for example, about 50 microseconds.

With the above-described configuration, the position of the liquid discharge head unit 210 is controlled by, for example, PID control. Note that, alternatively, a processor can have the functions of the correction circuit CRCO, the correction calculation circuit CRCAL, the PID control circuit CRCT, and the PWM signal generation circuit CRPS.

Figure 21:
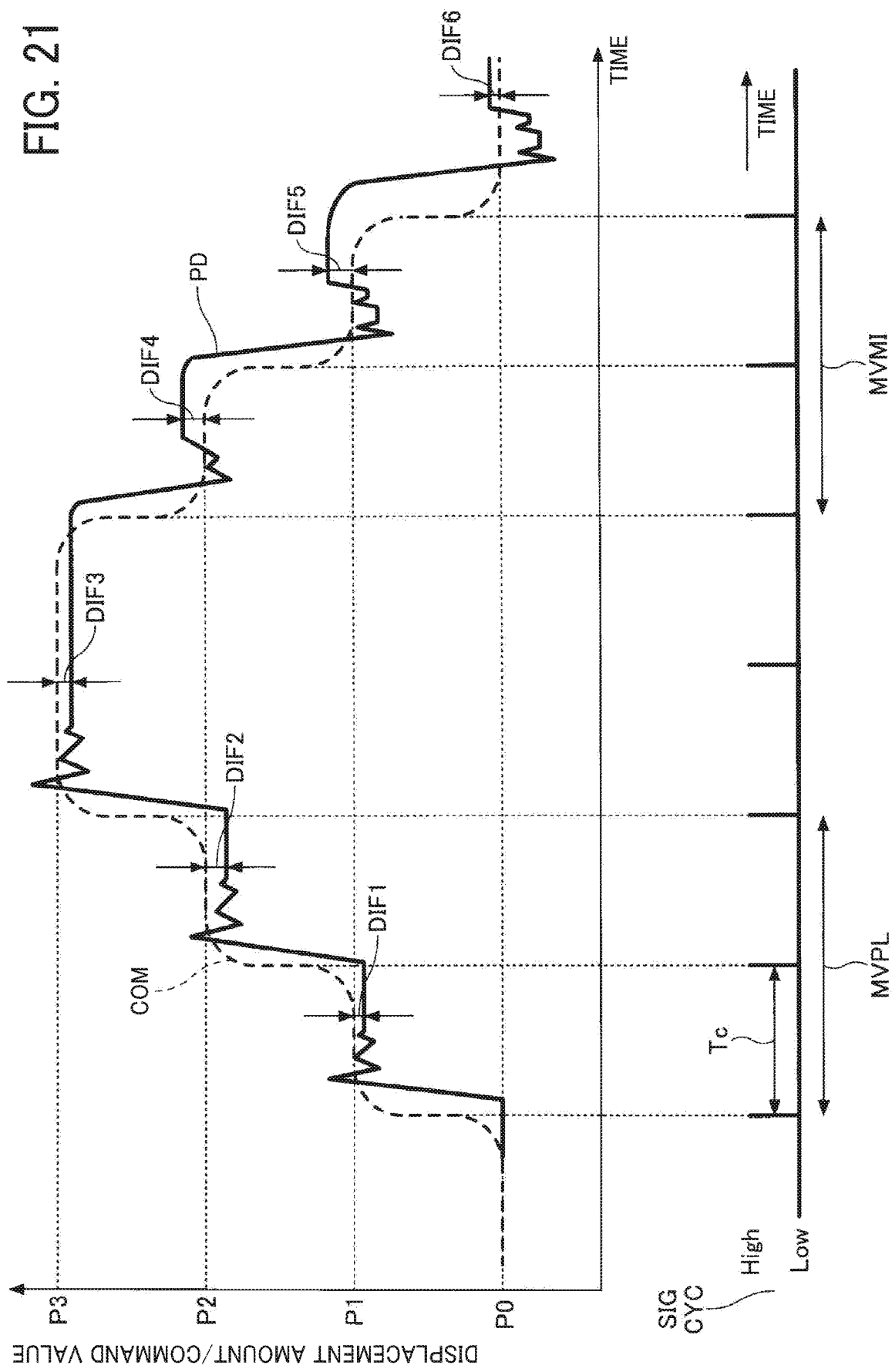
FIG. 21 is a chart illustrating a relation between a displacement amount and a command value in travel control including reciprocation, according to one embodiment.

FIG. 21 is a chart illustrating a relation between the displacement amounts PD and the command values COM in control operation including reciprocation of the liquid discharge head unit 210. The processing illustrated in FIG. 21 relates to one of the liquid discharge head units 210. Descriptions are given below of a case where oscillation inherent to the displacement amount PD is small and the displacement amount PD approximately follows the command value COM input for each control period Tc.

The control period Tc is predetermined in the liquid discharge apparatus 110. The command value COM is input for each control period Tc. In the illustrated example, a control period signal SIGCYC indicates the control period Tc.

The control period signal SIGCYC specifies that the command value COM is input when the control period signal SIGCYC is at high level. In the illustrated example, the command value COM is input seven times.

In this example, the first three of the seven command values COM instruct the liquid discharge head unit 210 to move in one direction (e.g., positive direction) and hereinafter referred to as "positive command values MVPL". In response to the positive command value MVPL, the liquid discharge head unit 210 moves in the positive direction.

By contrast, the last three of the seven command values COM instruct the liquid discharge head unit 210 to move in the direction different from the positive direction and hereinafter referred to as "negative command values MVMI". In response to the negative command value MVMI, the liquid discharge head unit 210 moves in a negative direction.

It is assumed that, in the illustrated example, the positive command value MVPL and the negative command value MVMI have an almost equal amplitude so that the amount of travel instructed by each command value is almost equal. Accordingly, the liquid discharge head unit 210 initially moves in the positive direction according to the positive command value MVPL (forward movement). Subsequently, the liquid discharge head unit 210 moves in the negative direction according to the negative command value MVMI (return movement). Thus, the liquid discharge head unit 210 reciprocates according to the positive command value MVPL and the negative command value MVMI.

In the illustrated example, the liquid discharge apparatus 110 obtains the displacement amount PD of the liquid discharge head unit 210 for each control period Tc (at S04 in FIG. 18). Specifically, in response to the first input of the command value COM (first movement in the positive direction), the liquid discharge apparatus 110 obtains a first difference DIF1. Similarly, in response to the second time input and the third time input of the command value COM (second and third movement in the positive direction), the liquid discharge apparatus 110 obtains second and third differences DIF2 and DIF3, respectively.

Initially, the liquid discharge head unit 210 is positioned at an initial position P0. The destination specified by the first input of command value COM is a first position P1. The difference between the amount by which the liquid discharge head unit 210 has moved according to the first input of command value COM and the first position P1 is the first difference DIF1.

Similarly, the destination specified by the second input of command value COM is a second position P2. The difference between the amount by which the liquid discharge head unit 210 has moved according to the second input of command value COM and the second position P2 is the second difference DIF2.

Similarly, the destination specified by the third input of command value COM is a third position P3. The difference between the amount by which the liquid discharge head unit 210 has moved according to the third input of command value COM and the third position P3 is the third difference DIF3.

In the return movement, similarly, the liquid discharge apparatus 110 obtains the displacement amount PD of the liquid discharge head unit 210 for each control period Tc. Specifically, similar to the first to third time input of the command value COM, in response to the fifth time input of the command value COM (first movement in the negative direction), the liquid discharge apparatus 110 obtains a fourth difference DIF4. Similarly, in response to the six time input and the seventh time input of the command value COM (second and third movements in the negative direction), the liquid discharge apparatus 110 obtains fifth and sixth differences DIF5 and DIF6, respectively.

The destination specified by the fifth input of command value COM is the second position P2. The difference between the amount by which the liquid discharge head unit 210 has moved according to the fifth input of command value COM and the second position P2 is the fourth difference DIF4.

The destination specified by the sixth input of command value COM is the second position P1. The difference between the amount by which the liquid discharge head unit 210 has moved according to the sixth input of command value COM and the first position P1 is the fifth difference DIF5.

The destination specified by the seventh input of command value COM is the initial position P0. The difference between the amount by which the liquid discharge head unit 210 has moved according to the seventh input of command value COM and the initial position P0 is the sixth difference DIF6.

There are cases where the mass of the liquid discharge head unit 210 is greater than the mass of the actuator AC. The mass of the liquid discharge head unit 210 can be several tens greater than the mass of the actuator AC. In such a case, as the rotation axis of the actuator AC moves in the positive direction, there arises an effect of reaction. Then, force pushing in the negative direction can act on the actuator AC.

Generally, the difference DIF between the command value COM and the displacement amount PD varies depending on manufacturing error of the liquid discharge head unit 210 and the manner of mounting. For example, due to a layout constraint in the liquid discharge apparatus 110, the liquid discharge head unit 210 may be mounted in an inclined manner.

The difference DIF between the command value COM and the displacement amount PD can also vary between the forward movement and the return movement due to a structure to move the liquid discharge head unit 210. In view of the foregoing, obtaining the displacement amount PD for each control period Tc is advantageous in absorbing the characteristic of the difference between the command value COM and the displacement amount PD that differs between the forward movement and the return movement.

As described above, the liquid discharge apparatus 110 calculates the difference DIF between the command value COM and the displacement amount PD of the liquid discharge head unit 210. Then, the liquid discharge apparatus 110 calculates the correction value CO based on the difference DIF between the command value COM and the displacement amount PD. Specifically, as illustrated in FIG. 19, the displacement amount PD is smaller than the command value COM in some cases. To adapt to such characteristics, the correction value CO increases the command value COM. In other words, the correction circuit CRCO illustrated in FIG. 20 adds the correction value CO to the command value COM input thereto. Then, the difference from the command value COM can be reduced, and the liquid discharge head unit 210 can be moved accurately.

Note that the processing such as acquisition of the displacement amount PD of the head unit and calculation of the displacement (e.g., meandering) of the conveyed object can take long time. If the processing takes time longer than the control period, performing the process illustrated in FIG. 18 at each control period is difficult.

In such a case, the process illustrated in FIG. 18 can be performed for each period that is an integral multiple of the control period.

Alternatively, the liquid discharge apparatus 110 can measure the oscillation period of the displacement amount PD and perform the process illustrated in FIG. 18 in the oscillation period or a period that is an integral multiple of the oscillation period. Acquiring the displacement amount PD in such a cycle is advantageous in accurately acquiring even when the amplitude of the oscillation changes.

Figure 22:
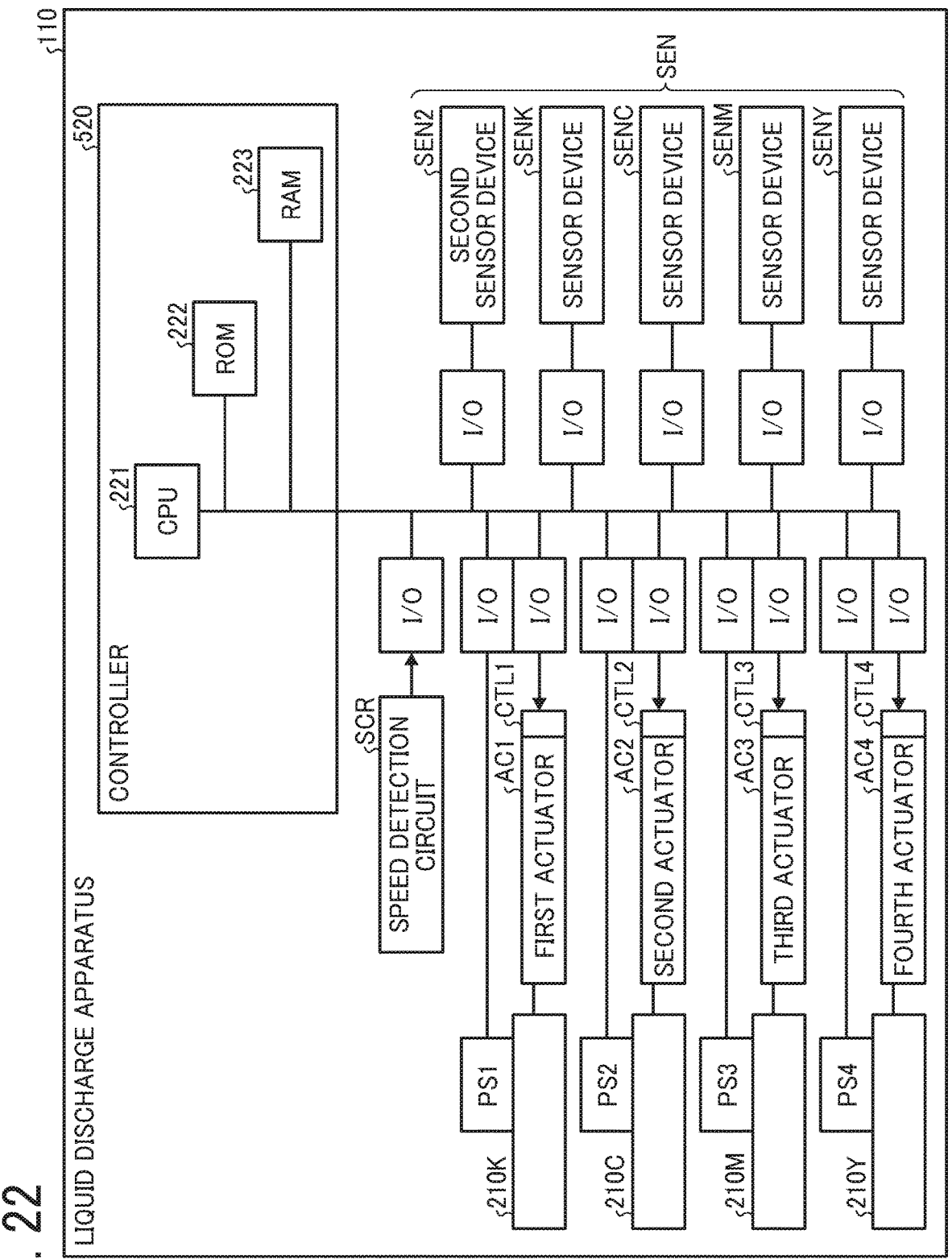
FIG. 22 is a block diagram of an example hardware configuration to move the liquid discharge head unit of the liquid discharge apparatus according to an embodiment.

FIG. 22 is a block diagram of an example hardware configuration to move the liquid discharge head units 210 according to the present embodiment. In the illustrated example, the liquid discharge apparatus 110 includes a plurality of actuators AC, a plurality of displacement sensors PS, and a plurality of sensor devices SEN each of which includes the conveyed object sensor WS. In the illustrated example, the liquid discharge apparatus 110 includes the controller 520, and the actuator controller CTL is connected to each actuator AC. The controller 520 includes a central processing unit (CPU) 221, a read only memory (ROM) 222, and a random access memory (RAM) 223. As illustrated in FIG. 22, each device (e.g., the sensor devices SEN and the actuators AC) of the liquid discharge apparatus 110 can further include an input/output (I/O) interface for data transmission and reception with another device.

Note that the configuration is not limited to the illustrated configuration. That is, the illustrated devices can be components of either the liquid discharge apparatus 110 or an external apparatus.

Each actuator AC is coupled to the liquid discharge head unit 210 to be driven by that actuator AC. Specifically, the first actuator AC1 is coupled to the black liquid discharge head unit 210K to move the black liquid discharge head unit 210K.

Similarly, the second actuator AC2 is coupled to the cyan liquid discharge head unit 210C to move the cyan liquid discharge head unit 210C in the direction orthogonal to the conveyance direction 10 in which the web 120 is conveyed.

Similarly, the third actuator AC3 is coupled to the magenta liquid discharge head unit 210M to move the magenta liquid discharge head unit 210M.

Similarly, the fourth actuator AC4 is coupled to the yellow liquid discharge head unit 210Y to move the yellow liquid discharge head unit 210Y. As described above, when the black liquid discharge head unit 210K is not moved in the orthogonal direction 20, the first actuator AC1 can be omitted. In this case, further, the second sensor device SEN2 can be omitted.

The CPU 221 is example hardware to implement the calculator 110F60 illustrated in FIG. 7, the correction circuit CRCO illustrated in FIG. 20, and the correction calculation circuit CRCAL. Specifically, the CPU 221 acquires the data output from the conveyed object sensors WS and calculates the displacement of the conveyed object. The CPU 221 further acquires the outputs from the displacement sensors PS and calculates the corrected command value COM' to control each actuator AC, based on the displacement PD of the head unit calculated from the data output from the conveyed object sensors WS and the output from the displacement sensor PS. As described above, the actuator controller CTL performs PID control to adjust the position of the liquid discharge head unit 210.

The ROM 222 and the RAM 223 are examples of memories. For example, the ROM 222 stores programs and data used by the CPU 221. Additionally, the RAM 223 stores the program for the operation performed by the CPU 221 and serves as a memory region to implement the operation.

A speed detection circuit SCR is an electronic circuit to detect, for example, the speed at which the conveyed object is conveyed. For example, 6 ppi signal is input to the speed detection circuit SCR. Then, the speed detection circuit SCR calculates the speed at which the conveyed object is conveyed, based on the detection result from the encoder, for example, attached to the roller 230, and transmits the calculated speed to the CPU 221. Although the actuator controller CTL is separate hardware from the CPU 221 in the illustrated example, alternatively, identical hardware can implement the actuator controller CTL and the controller 520.

Figure 23:
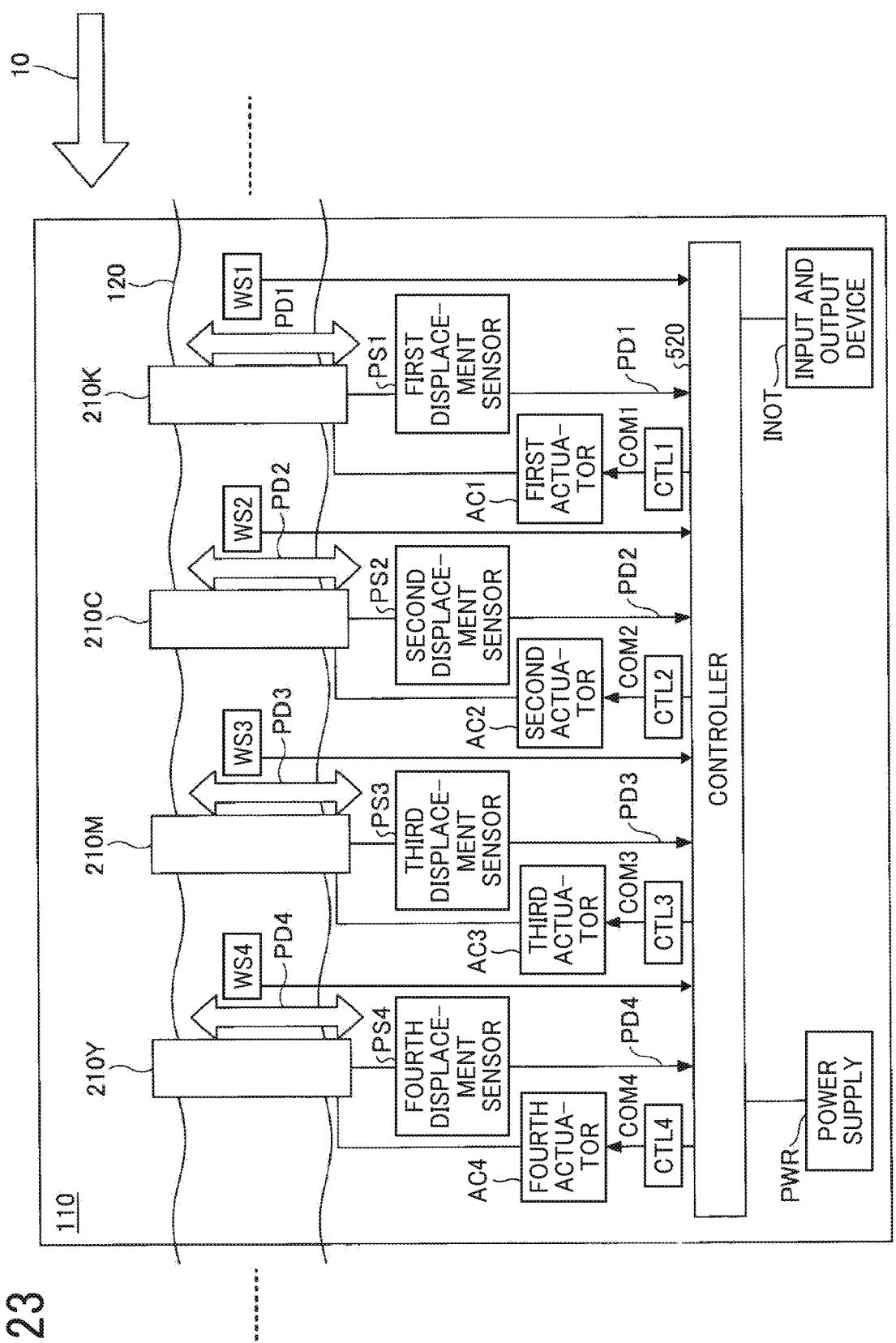
FIG. 23 is a block diagram of an example of an entire structure to move the liquid discharge head units, according to one embodiment.

FIG. 23 is a block diagram of an example of an entire structure to move the liquid discharge head units 210 according to the present embodiment.

Referring to FIG. 23, the first conveyed object sensor WS1 of the sensor device SENK, the second conveyed object sensor WS2 of the sensor device SENC, the third conveyed object sensor WS3 of the sensor device SENM, and the fourth conveyed object sensor WS4 of the sensor device SENY acquire data of the web 120 (i.e., sensor data) at respective positions. The controller 520 outputs the command value COM or the corrected command value COM' based on the sensor data. In the illustrated example, the liquid discharge apparatus 110 includes the first second, third, and fourth actuators AC1, AC2, AC3, and AC4 to move the liquid discharge head units 210 respectively. In FIG. 13, the first second, third, and fourth actuators AC1, AC2, AC3, and AC4 are represented by the actuator AC.

Each actuator AC moves the liquid discharge head unit 210 based on the command value COM or the corrected command value COM' input from the controller 520. Specifically, a command value COM1 or a corrected command value COM1' is input to the first actuator controller CTL1 connected to the first actuator AC1. Similarly, a command value COM2 or a corrected command value COM2' is input to the second actuator controller CTL2 connected to the second actuator AC2. A command value COM3 or a corrected command value COM3' is input to the actuator controller CTL3 connected to the third actuator AC3. A command value COM4 or a corrected command value COM4' is input to the actuator controller CTL4 connected to the fourth actuator AC4.

Controlled by the first actuator controller CTL1, the first actuator AC1 moves the black liquid discharge head unit 210K. The first displacement sensor PS1 obtains the amount by which the liquid discharge head unit 210K has moved (hereinafter "first displacement amount PD1").

Similarly, controlled by the second actuator controller CTL2, the second actuator AC2 moves the cyan liquid discharge head unit 210C. The second displacement sensor PS2 obtains the amount by which the liquid discharge head unit 210C has moved (hereinafter "second displacement amount PD2").

Controlled by the actuator controller CTL3, the third actuator AC3 moves the magenta liquid discharge head unit 210M. The third displacement sensor PS3 obtains the amount by which the liquid discharge head unit 210M has moved (hereinafter "third displacement amount PD3").

Controlled by the actuator controller CTL4, the fourth actuator AC4 moves the yellow liquid discharge head unit 210Y. The fourth displacement sensor PS4 obtains the amount by which the liquid discharge head unit 210Y has moved (hereinafter "fourth displacement amount PD4").

Then, the controller 520 calculates the corrected command values COM' based on the output from the displacement sensors PS.

Each command value COM indicates the destination of the liquid discharge head unit 210 moved to compensate for the displacement calculated as illustrated in FIG. 14. The corrected command value COM' is corrected from the command value COM based on the difference from the displacement amount of the head unit. Each actuator AC moves the liquid discharge head unit 210 to the destination instructed by the command value COM or the corrected command value COM', under the PID control performed by the actuator controller CTL.

Note that, when black is used as reference, the position of the liquid discharge head unit 210K can be fixed. That is, when black is the reference, the liquid discharge head unit 210 is retained at a predetermined position to obviate the mechanism to move the liquid discharge head unit 210K. The mechanism to move the liquid discharge head unit 210 of the reference color can be omitted.

An input and output device INOT serves as an interface for a user to input a parameter or the like for the control. At the occurrence of an error, the input and output device INOT outputs an error message to the user. For example, the input and output device INOT is a control panel.

A power supply PWR supplies power to devices of the liquid discharge apparatus 110. For example, the power supply PWR supplies the actuator controller CTL and the like with a predetermined voltage (e.g., 5 V) determined by the specifications. Similarly, the power supply PWR supplies each actuator and the like with a predetermined voltage (e.g., 24 V) determined by the specifications.

Another Example of Operation

The liquid discharge apparatus 110 can perform the following processing before performing image formation.

Figure 24:
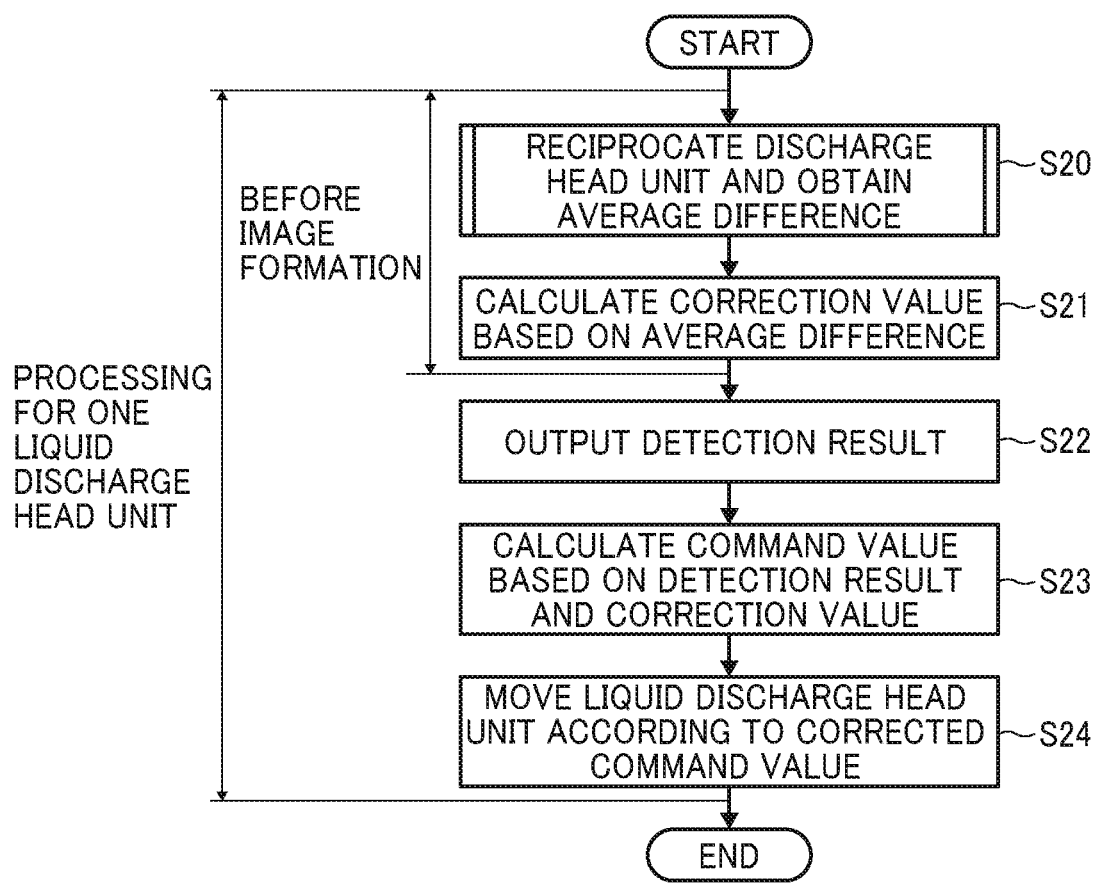
FIG. 24 is a flowchart of another operation performed by the liquid discharge apparatus, according to one embodiment.

FIG. 24 is a flowchart of another operation performed by the liquid discharge apparatus 110. Steps S22 to S24 in FIG. 24 are similar to S06 to S08 in FIG. 18, and thus redundant description is omitted.

There may be a case where the correction value is not calculated in time for each control period. Alternatively, there may be a case where the phase of the liquid discharge head unit 210 delays by 180 degrees in the relation with the command value and the displacement amount, and the oscillation of the liquid discharge head unit 210 does not converge but oscillate. Then, completing the processing in a period shorter than the control period is difficult.

In view of the foregoing, the liquid discharge apparatus 110 can be configured to perform the following processing, for example, before image formation or after power on. For example, before image formation, time is secured for preheating a heater to dry the liquid applied on the recording medium. Performing the illustrated processing at such timing is preferred.

For example, performing the correction before image formation is advantageous in that, even when the liquid discharge head unit 210 has aged, the effect of aging can be minimized.

At S20, the liquid discharge apparatus 110 causes the liquid discharge head units 210 to reciprocate and obtains an average of the differences DIF. The description below concerns the case where, similar to the example illustrated in FIG. 21, the liquid discharge head unit 210 is moved three times in the positive direction and three times in the negative direction. In this example, as described later with reference to FIG. 25, the average of the differences DIF between the command values COM and the displacement amounts PD is calculated.

At S21, the liquid discharge apparatus 110 calculates the correction value based on the average difference. That is, at S21, the liquid discharge apparatus 110 calculates the correction value CO to compensate for the average difference in the position adjustment of the liquid discharge head unit 210. Specifically, the liquid discharge apparatus 110 multiplies the average difference with "−1" to calculate the correction value CO.

With the correction value CO thus calculated, the liquid discharge apparatus 110 can control the position of the liquid discharge head unit 210 according to the corrected command value COM', similar to the processes performed at S06 to S08 in FIG. 18.

That is, through steps S22 to S24 similar to steps S06 to S08 in FIG. 18, the command value COM is corrected with the correction value CO. For example, the correction circuit CRCO illustrated in FIG. 20 corrects the command value COM.

Calculation of the difference DIF is not limited to that illustrated example. It is preferable that the processing illustrated in FIG. 24 be performed in a case where the difference DIF is approximately equal between the positive direction and the negative direction. In a case where the difference DIF varies between odd number of times and even number of times, the average difference can be calculated separately for odd number of times and even number of times.

Figure 26:
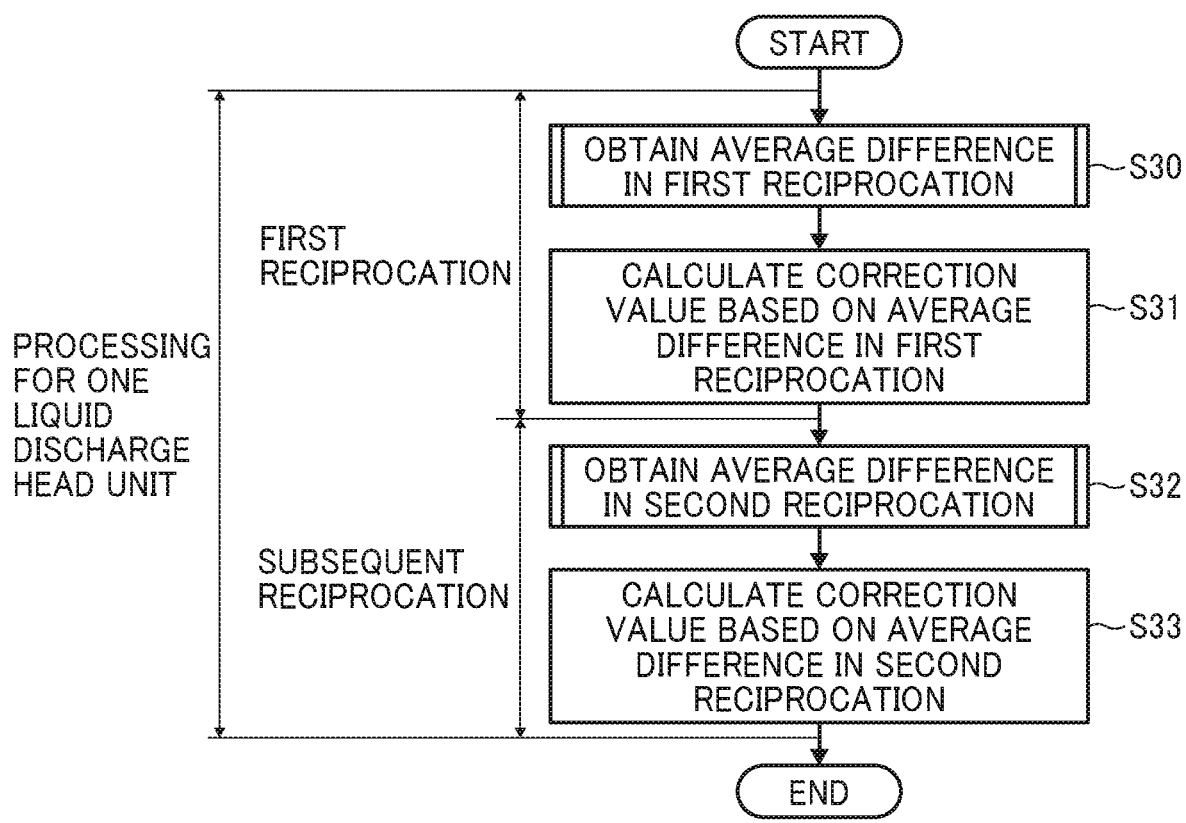
FIG. 26 is a flowchart of acquisition of an average difference in a plurality of times of reciprocation, according to one embodiment.

The reciprocation can be performed a plurality of times. The number of times of the reciprocation is not limited to once as in FIG. 21. Then, the liquid discharge apparatus 110 can calculate the average difference in the plurality of times of the reciprocation, for example, as illustrated in FIG. 26 to be described later.

Figure 25:
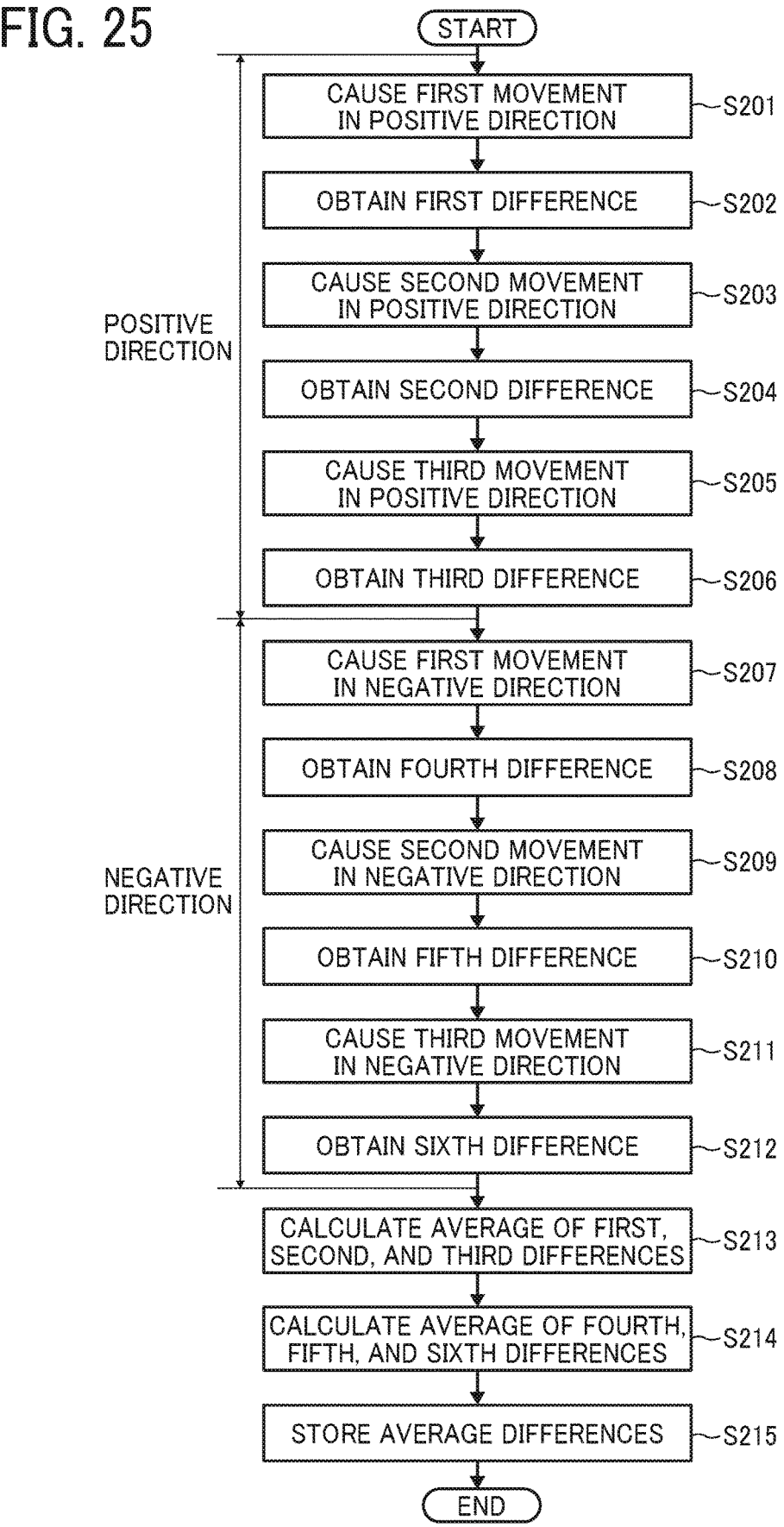
FIG. 25 is a flowchart of acquisition of a difference between the command value and the displacement amount of the liquid discharge head unit, according to one embodiment.

FIG. 25 is a flowchart of acquisition of the difference DIF between the command value COM and the displacement amount PD of the liquid discharge head unit 210 according to an embodiment. For example, in the position control illustrated in FIG. 21, at S20 in FIG. 24, the process illustrated in FIG. 25 is performed to obtain the average difference. Preferably, the average difference is obtained separately in the positive direction and the negative direction.

At S201, the liquid discharge apparatus 110 causes the liquid discharge head unit 210 to make the first movement in the positive direction. In the example illustrated in FIG. 21, in the first movement in the positive direction, the command value COM instructs the movement to the first position P1.

At S202, the liquid discharge apparatus 110 obtains the first difference DIF1. In the example illustrated in FIG. 21, the liquid discharge apparatus 110 compares the first position P1 with the displacement amount PD to obtain the first difference DIF1.

At S203, the liquid discharge apparatus 110 causes the liquid discharge head unit 210 to make the second movement in the positive direction. In the example illustrated in FIG. 21, in the second movement in the positive direction, the command value COM instructs the movement to the second position P2.

At S204, the liquid discharge apparatus 110 obtains the second difference DIF2. In the example illustrated in FIG. 21, the liquid discharge apparatus 110 compares the second position P2 with the displacement amount PD to obtain the second difference DIF2.

At S205, the liquid discharge apparatus 110 causes the liquid discharge head unit 210 to make the third movement in the positive direction. In the example illustrated in FIG. 21, in the third movement in the positive direction, the command value COM instructs the movement to the third position P3.

At S206, the liquid discharge apparatus 110 obtains the third difference DIF3. In the example illustrated in FIG. 21, the liquid discharge apparatus 110 compares the third position P3 with the displacement amount PD to obtain the third difference DIF3.

At S207, the liquid discharge apparatus 110 causes the liquid discharge head unit 210 to make the first movement in the negative direction. In the example illustrated in FIG.

21, in the first movement in the negative direction, the command value COM instructs the movement to the second position P2.

At S208, the liquid discharge apparatus 110 obtains the fourth difference DIF4. In the example illustrated in FIG. 21, the liquid discharge apparatus 110 compares the second position P2 with the displacement amount PD to obtain the fourth difference DIF4.

At S209, the liquid discharge apparatus 110 causes the liquid discharge head unit 210 to make the second movement in the negative direction. In the example illustrated in FIG. 21, in the second movement in the negative direction, the command value COM instructs the movement to the first position P1.

At S210, the liquid discharge apparatus 110 obtains the fifth difference DIF5. In the example illustrated in FIG. 21, the liquid discharge apparatus 110 compares the first position P1 with the displacement amount PD to obtain the fifth difference DIF5.

At S211, the liquid discharge apparatus 110 causes the liquid discharge head unit 210 to make the third movement in the negative direction. In the example illustrated in FIG. 21, in the third movement in the negative direction, the command value COM instructs the movement to the initial position P0.

At S212, the liquid discharge apparatus 110 obtains the sixth difference DIF6. In the example illustrated in FIG. 21, the liquid discharge apparatus 110 compares the initial position P0 with the displacement amount PD to obtain the sixth difference DIF6.

At S213, the liquid discharge apparatus 110 calculates an average of the first, second, and third differences DIF1, DIF2, and DIF3. Thus, the average difference in the forward movement (in the positive direction) is obtained. In other words, at S213, the average of the differences arising in the movement in the positive direction is calculated.

At S214, the liquid discharge apparatus 110 calculates an average of the fourth, fifth, and sixth differences DIF4, DIF5, and DIF6. Thus, the average difference in the return movement (in the negative direction) is obtained. In other words, at S214, the average of the differences arising in the movement in the negative direction is calculated.

At S215, the liquid discharge apparatus 110 stores the average differences calculated at S213 and S214, respectively.

FIG. 26 is a flowchart of acquisition of the average of differences DIF between the command value COM and the displacement amount PD in a plurality of times of reciprocation. In the description below, the reciprocation is performed twice.

At S30, the liquid discharge apparatus 110 obtains the average difference in the first reciprocation of the liquid discharge head unit 210 through the process illustrated in FIG. 25, that is, the step S20 in FIG. 24.

At S31, the liquid discharge apparatus 110 calculates the correction value CO based on the average difference in the first reciprocation, through the process similar to that performed at S21 in FIG. 24.

Then, the liquid discharge apparatus 110 causes the liquid discharge head unit 210 to make second reciprocation based on the command values COM corrected with the correction value CO calculated based on the average difference in the first reciprocation. The second reciprocation is similar to the first reciprocation.

At S32, the liquid discharge apparatus 110 obtains the average difference in the second reciprocation of the liquid discharge head unit 210 through the process illustrated in FIG. 25, that is, the step S20 in FIG. 24, similar to the first time acquisition of average difference. Note that, in the second time acquisition of average difference, the corrected command value COM' is compared with the displacement amount PD as a result of position adjustment according to the corrected command value COM.

At S33, the liquid discharge apparatus 110 calculates the correction value CO based on the average difference in the second reciprocation, through the process similar to that performed at S21 in FIG. 24, similar to the first time calculation of correction value CO.

As described above, it is preferred that the correction value CO is corrected first time based on the average difference in the first reciprocation, after which the average difference in the second reciprocation is calculated. In other words, correcting the correction value CO a plurality of times is preferred, and further correcting the correction value CO corrected in the previous correction is preferred. Accordingly, the accuracy of the landing position of liquid can improve.

The reciprocation can be performed three times or more. The process from S32 to S33 is repeated according to the number of times of the reciprocation.

Calculating the correction value CO based on a plurality of times of the reciprocation is advantageous in improving the accuracy of the correction value CO. Accordingly, the accuracy of the landing position of liquid can improve.

The steps S20 and S21 illustrated in FIG. 24 can be performed before image formation and the process illustrated in FIG. 18 can be performed for each control period.

As described above, the liquid discharge apparatus 110 according to one embodiment can output the command value COM to move the liquid discharge head unit 210, based on the detection result calculated by the calculator 110F60. The detection result represents at least one of the position, speed of travel, and amount of travel of the conveyed object, acquired from the data output from the conveyed object sensors WS. When the actuator AC moves the liquid discharge head unit 210 according to the command value COM, however, the difference, such as the difference DIF illustrated in FIG. 21, tends to occur between the command value COM and the amount of the liquid discharge head unit 210 moved by the actuator AC. That is, the liquid discharge head unit 210 is not moved to the accurate position instructed by the command value COM.

Therefore, the liquid discharge apparatus 110 acquires, with the displacement sensor PS provided for the liquid discharge head unit 210, the displacement amount PD representing the position to which the liquid discharge head unit 210 has actually moved according to the command value COM. With this configuration, the liquid discharge apparatus 110 can compare the command value COM and the displacement amount PD to calculate the difference DIF therebetween.

Then, the liquid discharge apparatus 110 calculates, with the correction calculation circuit CRCAL, the correction value CO based on the difference DIF. In other words, the correction calculation circuit CRCAL calculates the correction value CO to minimize the difference DIF. Specifically, for a liquid discharge head unit that tends to move by an amount greater than the command value COM, the correction calculation circuit CRCAL calculates the correction value CO to reduce the amount of travel of the liquid discharge head unit. By contrast, for a liquid discharge head unit that tends to move by an amount smaller than the command value COM, the correction calculation circuit CRCAL calculates the correction value CO to increase the amount of travel of the liquid discharge head unit.

Then, liquid discharge apparatus 110 corrects, with the correction circuit CRCO, the command value CO. As the liquid discharge head unit 210 is moved according to the command value COM thus corrected, the difference DIF can be minimized. That is, the corrected command value COM' increases the possibility that the command value matches the displacement amount PD. Accordingly, the liquid discharge apparatus 110 can compensate for the displacement accurately, thereby improving the accuracy of operation such as the accuracy of landing position of liquid discharged.

In image formation with liquid discharged onto a recording medium, as the accuracy in droplet landing positions improves, misalignment in color superimposition is suppressed, improving image quality.

With the gauge such as an encoder, the position of the recording medium can be detected more reliably. For example, an encoder is attached to the rotation shaft of the roller 230, and the amount of travel of the recording medium can be measured with the encoder. In such a configuration, as the measurement result is further input thereto, the liquid discharge apparatus 110 can detect the position of the recording medium in the conveyance direction 10 and the like more reliably.

Variations

One or more of aspects of this disclosure can adapt to a conveyance system including at least one conveyance device such as the liquid discharge apparatus. For example, the liquid discharge head unit 210K and the liquid discharge head unit 210C are housed in a case of one apparatus, and the liquid discharge head unit 210M and the liquid discharge head unit 210Y are housed in a case of another apparatus. Then, the conveyance system includes the two apparatuses.

Figure 27:
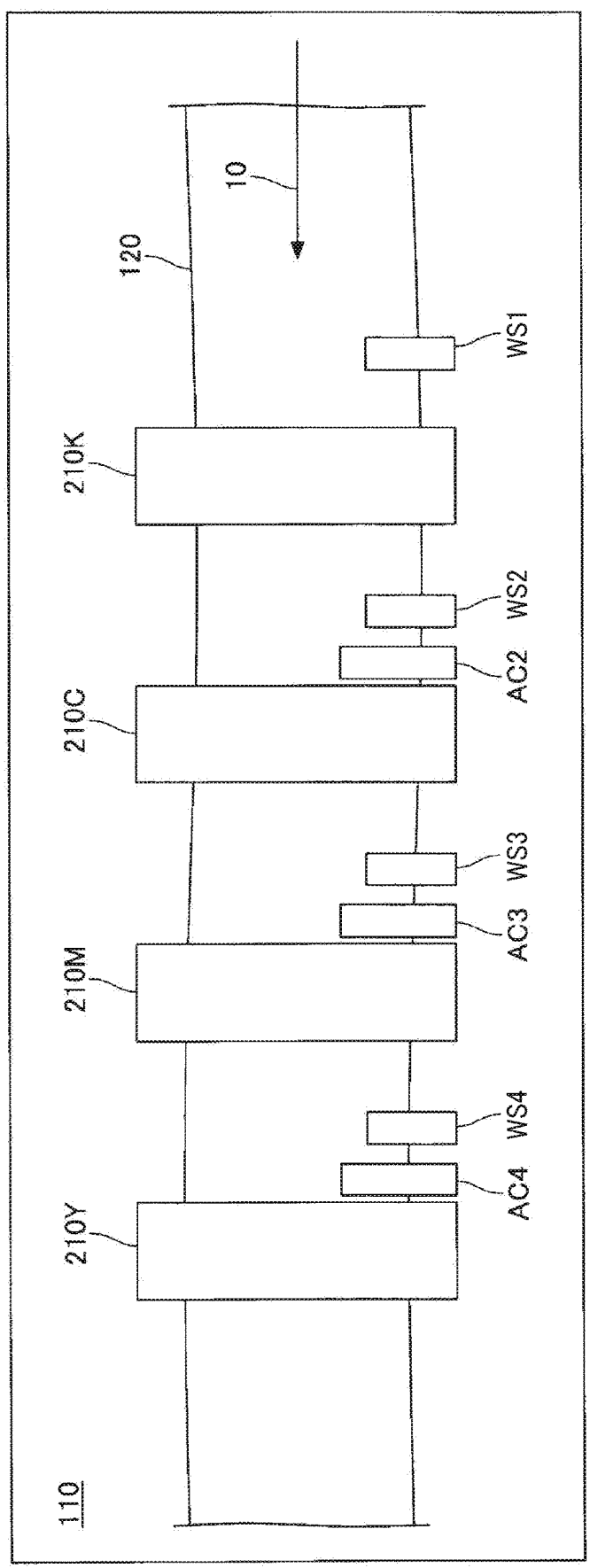
FIG. 27 is a plan view illustrating arrangement of conveyed object sensors according to a variation.

FIG. 27 is a plan view illustrating an example arrangement of the conveyed object sensors WS according to a variation. As illustrated in FIG. 27, the conveyed object sensor WS can be an edge sensor to detect an end of the web 120 in the direction orthogonal to the conveyance direction 10. For example, the edge sensor is a contact image sensor (CIS).

In the example illustrated in FIG. 27, one conveyed object sensor WS is disposed upstream from each liquid discharge head unit 210 in the conveyance direction 10. The conveyed object sensor WS is disposed at a position where the end of the web 120 in the direction orthogonal to the conveyance direction 10 passes. In this variation, similar to the above-described embodiment, the actuator AC1 to move the black liquid discharge head unit 210K can be provided as illustrated in FIG. 6.

The conveyed object is not limited to recording media such as paper sheets but can be any material to which liquid adheres, even temporarily. Examples of the material to which liquid adheres include paper, thread, fiber, cloth, leather, metal, plastic, glass, wood, ceramics, and a combination thereof.

Further, one or more of aspects of this disclosure can adapt to a liquid discharge apparatus or a liquid discharge system to discharge liquid other than ink. For example, the liquid is a recording liquid of another type or a fixing solution. In other words, aspects of this disclosure can adapt to a liquid discharge apparatus to discharge liquid other than ink and a system including such a liquid discharge apparatus.

The liquid discharge apparatus (or system) to which at least one aspect of this disclosure is applicable is not limited to apparatuses to form images. The image (an article) produced can be, for example, a three-dimensional object (a 3D-fabricated object).

Further, aspects of this disclosure can adapt to any apparatus to perform an operation or processing on a conveyed object, using a line head unit including heads lined in a direction orthogonal to the direction of conveyance of the conveyed object.

Variation 1

A single support can double as the first and second supports. An example configuration of the first and second supports is described below.

Figure 28:
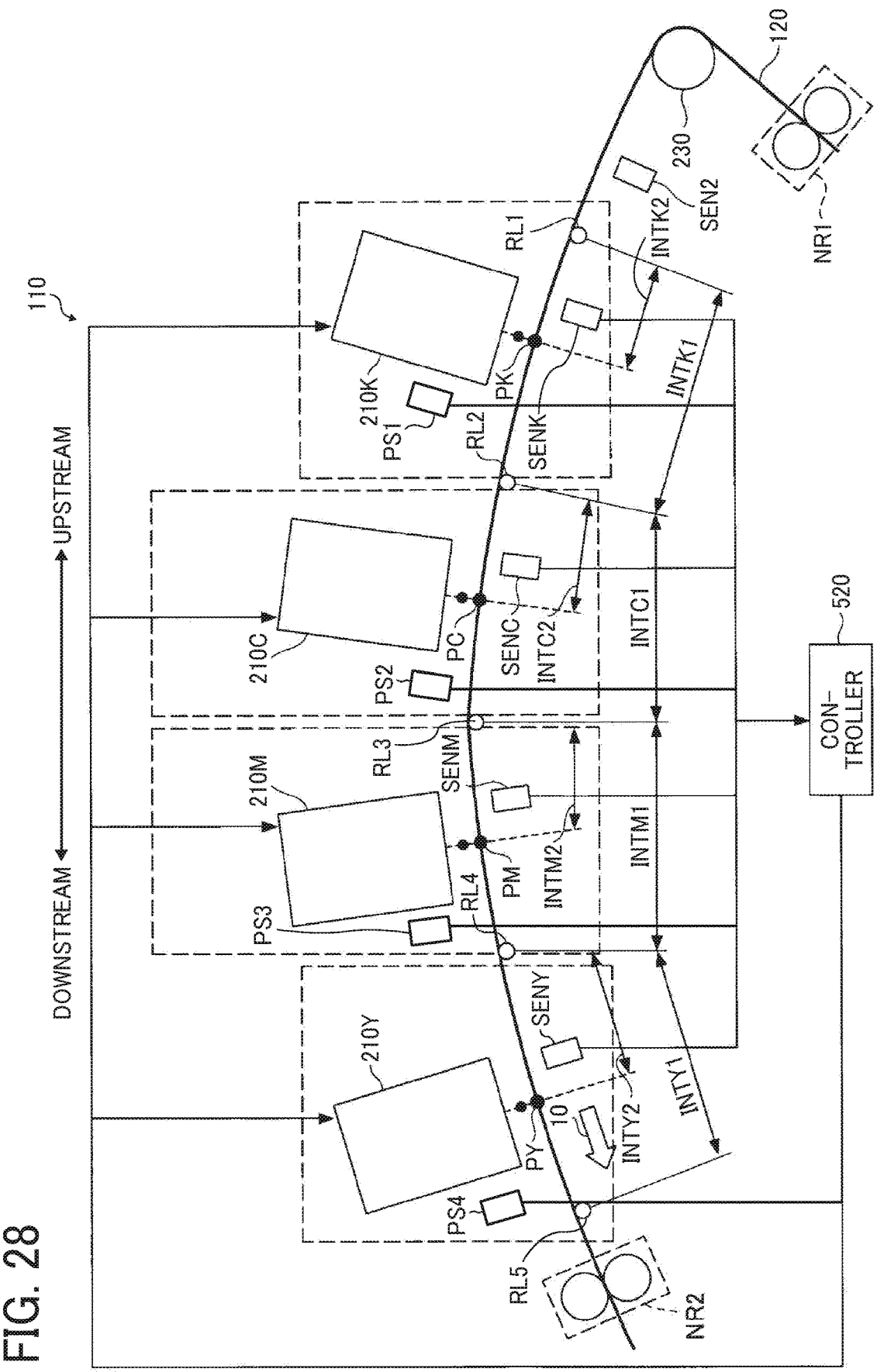
FIG. 28 is a schematic view of a conveyance device according to Variation 1.

FIG. 28 is a schematic view of a liquid discharge apparatus according to Variation 1. This configuration differs from the configuration illustrated in FIG. 2 regarding the locations of the first support and the second support. The liquid discharge apparatus 110 illustrated in this drawing includes supports RL1, RL2, RL3, RL4, and RL5, serving as the first and second supports. In other words, one support can double as the second support (e.g., the conveyance roller CR2K in FIG. 2) disposed upstream from the downstream one of adjacent two liquid discharge head units 210 and the first support (e.g., the conveyance roller CR1C in FIG. 2) disposed upstream from the upstream one of the adjacent two liquid discharge head units 210. Note that, the support according to the variation, which doubles as the first and second supports, can be either a roller or a curved plate.

Variation 2

For example, the conveyance device according to this disclosure can be a device to perform operation, such as reading, relative to the conveyed object.

Figure 29:
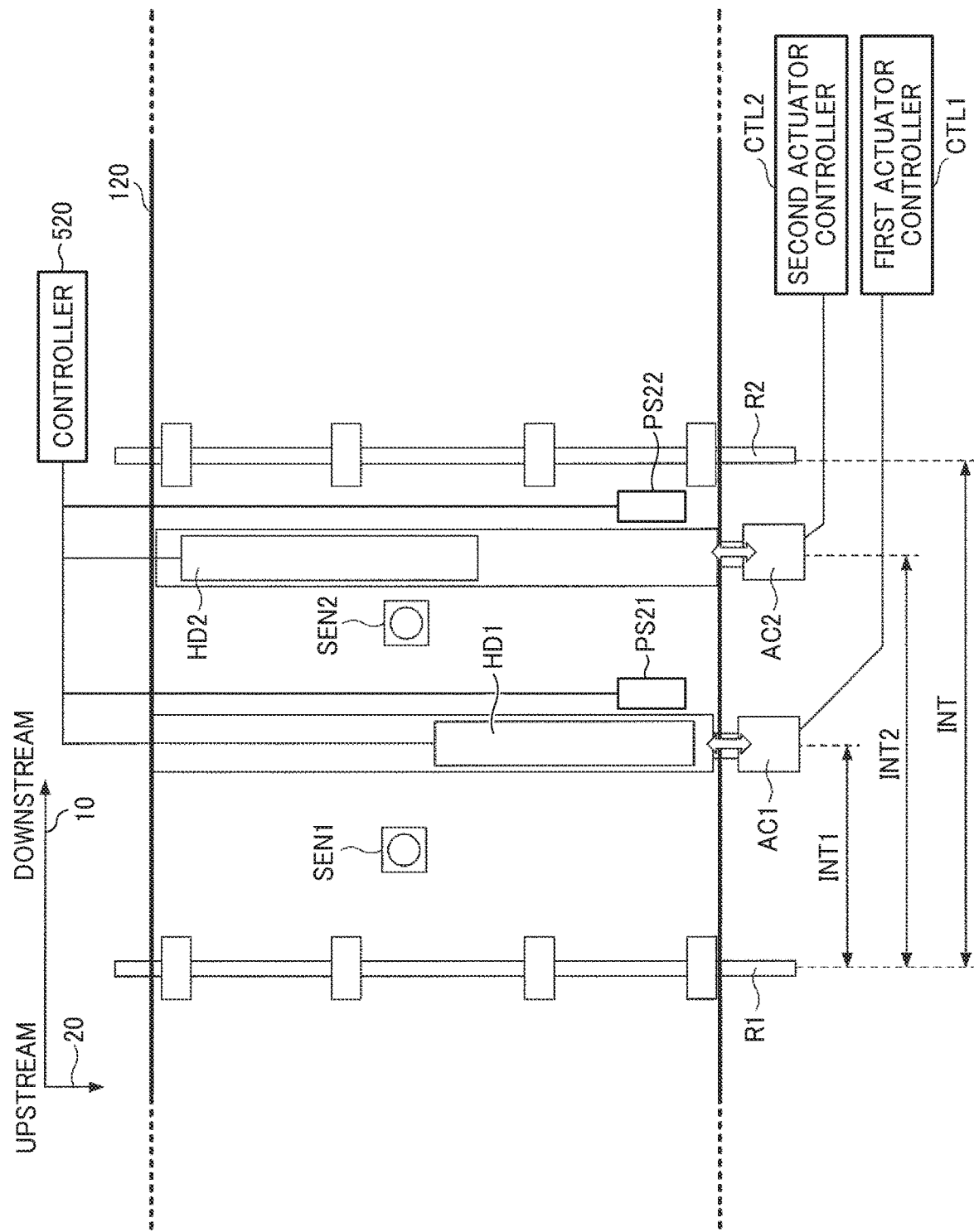
FIG. 29 is a schematic view of a conveyance device according to Variation 2.

FIG. 29 is a schematic view of a conveyance device according to Variation 2. In the example described below, the web 120 is conveyed from the left to the right in the drawing.

In this example, the conveyance device includes a head unit including at least one contact image sensor (CIS) head.

When head unit includes a plurality of CIS heads, the CIS heads are arranged in the orthogonal direction 20. In the illustrated example, the conveyance device includes two head units HD1 and HD2 (also collectively "head units HD"). The number of head units is not limited two but can be three or more.

As illustrated in FIG. 29, the head units HD1 and HD2 each include at least one CIS head. Although a description is made below of a configuration in which each head unit HD includes one CIS head, alternatively, a plurality of CIS heads can be arranged in a zigzag manner, for example, with each two CIS heads staggered.

The head units HD1 and HD2 construct a scanner to read an image on the surface of the web 120 and output image data representing the image thus read. The conveyance device can combine pieces of image data output from the head units HD together to generate an image combined in the orthogonal direction 20.

The conveyance device illustrated in FIG. 29 includes the controller 520, and the first and second actuator controllers CTL1 and CTL2. The controller 520 and the first and second actuator controllers CTL1 and CTL2 are information processing apparatuses and, specifically, have hardware including a processor such as a CPU, an electronic circuit, or a combination thereof; a control device, a memory device, and an interface. Note that the controller 520 and the first and second actuator controllers CTL1 and CTL2 can be implemented by either a plurality of devices or a single device.

The head units HD are provided with sensor devices SEN1 and SEN2 (also collectively "sensor devices SEN"), respectively. The conveyance device detects, with the sensor devices SEN, the surface data of the web 120 and detects at least one of the relative position, speed of travel, and the amount of travel of the web 120 among a plurality of detection results.

For the two head units HD1 and HD2, a plurality of rollers is provided. As illustrated in the drawing, for example, a first roller R1 and a second roller R2 are respectively disposed upstream and downstream from the two head units HD1 and HD2.

The sensor device SEN disposed in an inter-roller range INT between the first and second rollers R1 and R2 can detect the web 120 at a position close to the operation position. Since the travel speed is relatively stable in the inter-roller range INT, the conveyance device can accurately detect at least one of the relative position, speed of travel, and the amount of travel of the conveyed object among a plurality of detection results, in the conveyance direction, the orthogonal direction, or both.

Preferably, in each inter-roller ranges INT1, the sensor device SEN is disposed closer to the first roller R1 than the operation position is. That is, preferably, the sensor device SEN performs the detection at a position upstream from the operation position of the head unit HD. In the illustrated example, the first sensor device SEN1 is preferably shifted closer toward the first roller R1 from the operation position of the head unit HD1, that is, in a first upstream range INT1 in the drawing.

Similarly, the second sensor device SEN2 is preferably shifted closer toward the first roller R1 from the operation position of the head unit HD2, that is, in a second upstream range INT2 in the drawing.

When the sensor devices SEN1 and SEN2 are disposed in the first and second upstream ranges INT1 and INT2, respectively, the conveyance device can detect the conveyed object with a high accuracy. The sensor devices SEN disposed upstream from the operation position of the head unit HD can detect the surface data of the conveyed object at a position upstream from the operation position. Then, based on the detection result, the conveyance device can calculate the timing of operation by the head unit HD, the amount by which the head unit HD is to be moved, or both in at least one of the orthogonal direction 20 and the conveyance direction 10. In other words, in a period from when the position of a given portion of the web 120 (conveyed object) is detected on the upstream side to when the detected portion of the web 120 reaches the operation position, the operation timing is calculated or the head unit HD is moved. Therefore, the conveyance device can change the operation position with high accuracy.

If the sensor device SEN is disposed directly below the head unit HD, in some cases, depending on the calculation of operation timing or time for moving the head unit HD, the start of operation may be delayed. Accordingly, disposing the sensor device SEN upstream from the operation position can minimize the delay in operation of the head unit HD. Additionally, there may be a restriction on disposing the sensor device SEN adjacent to the operation position, that is, directly below the head unit HD. Accordingly, the location of sensor device is preferably closer to the first roller R1 than the operation position, that is, upstream from the operation position.

The web 120 may be irradiated with light in both of the operation by the head unit HD and detection by the sensor device SEN. In particular, when the web 120 has a high degree of transparency, the light for one of the operation and the detection may disturb the other. In such a case, disposing the sensor device SEN and the head unit HD on an identical optical axis is undesirable.

By contrast, when the transparency of the web 120 is lower, the sensor device SEN can be directly below the head unit HD. In the illustrated example, the position directly below the head unit HD is on the back side of the operation position. In other words, in some cases, the operation position and the location of sensor device are almost identical in the conveyance direction 10, and the operation is made on one side (e.g., front side) of the web 120 and the other side of the web 120 (e.g., back side) is detected by the sensor device SEN.

The sensor device SEN disposed directly below the head unit HD can accurately detect the amount of travel of the conveyed object directly below the head unit HD. Therefore, in a case where the light for one of the operation and the detection does not disturb the other and the speed of control action is relatively fast, the sensor device SEN is preferably disposed closer to the position directly below the head unit HD. However, the location of sensor device is not limited to a position directly below the head unit HD, and similar calculation is feasible when the sensor device SEN is disposed otherwise.

Alternatively, in a configuration in which error is tolerable, the location of sensor device can be almost directly below the head unit HD, or downstream from the position directly below the head unit HD in the inter-roller range INT.

The head units HD are provided with displacement sensors PS21 and PS22, respectively. The displacement sensors PS21 and PS22 detect the amounts of displacement of the head units HD1 and HD2, respectively, and output the amounts of displacement to the controller 520. Based on the outputs from the displacement sensors P21 and P22, the controller 520 corrects the command values output to the actuator controllers CTL1 and CTL2. This configuration enables adjustment of reading position (operation position).

Variation 3

The liquid discharge apparatus 110 can convey a belt as the conveyed object.

Figure 30:
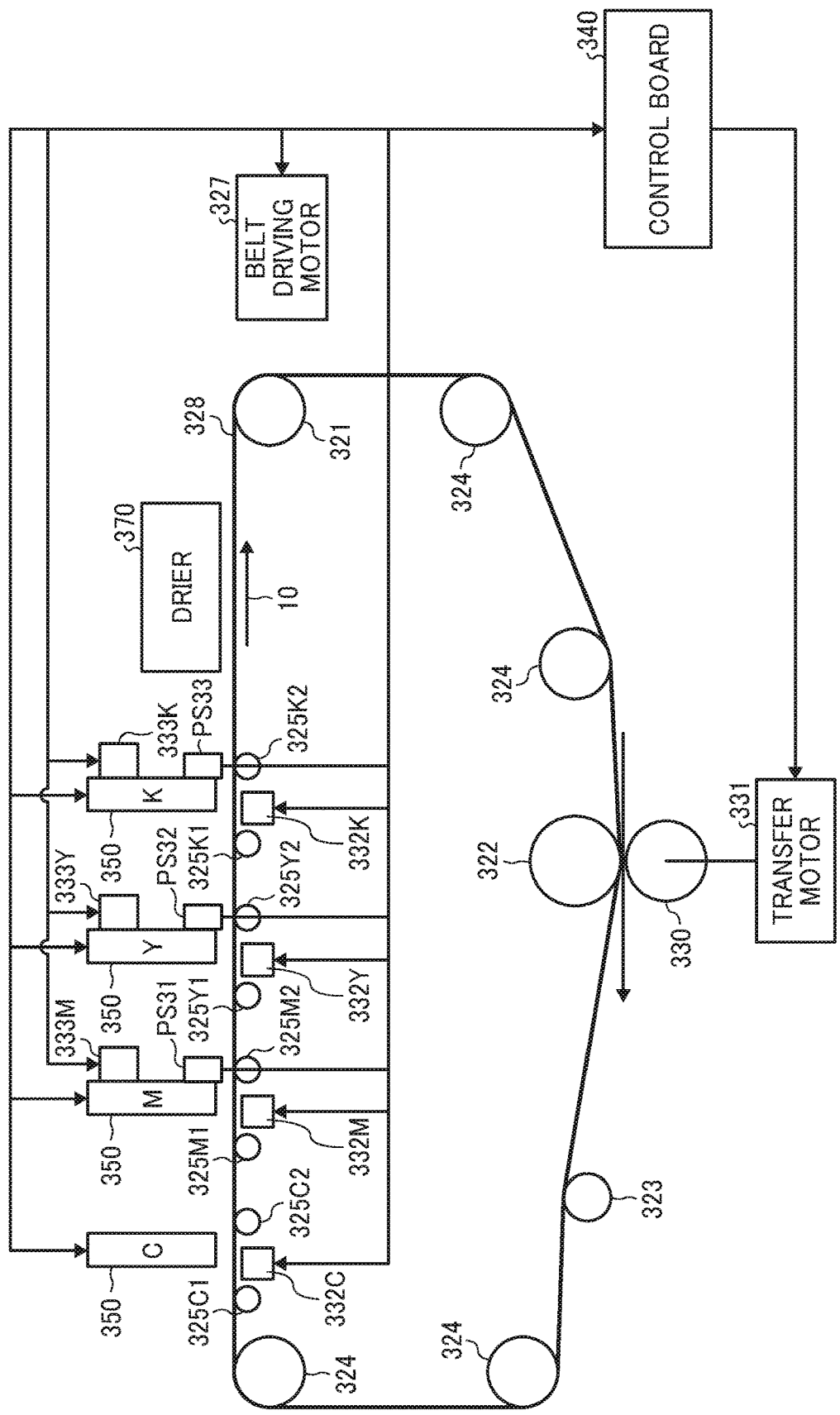
FIG. 30 is a schematic view of a conveyance device according to Variation 3.

FIG. 30 is a schematic view of a liquid discharge apparatus according to Variation 3. In this example, head units 350C, 350M, 350Y, and 350K discharge ink droplets to form an image on the outer side of the loop of a transfer belt 328. The head units 350C, 350M, 350Y, and 350K are also collectively referred to as head units 350.

A drier 370 dries an image formed on the transfer belt 328 into a film.

Then, at a transfer position where the transfer belt 328 faces a transfer roller 330, the liquid discharge apparatus 110 transfers the image in the form of film, conveyed on the transfer belt 328, onto a sheet.

Additionally, a cleaning roller 323 cleans the surface of the transfer belt 328 after the transfer.

In the liquid discharge apparatus 110 in this variation, the head units 350C, 350M, 350Y, and 350K, the drier 370, the cleaning roller 323, and the transfer roller 330 are disposed around the transfer belt 328.

In this example, the transfer belt 328 is stretched taut around a driving roller 321, an opposing roller 322 (a transfer-backup roller), four shape-keeping rollers 324, and eight support rollers 325C1, 325C2, 325M1, 325M2, 325Y1, 325Y2, 325K1, and 325K2. As the driving roller 321 rotates driven by a belt driving motor 327, the transfer belt 328 rotates in the conveyance direction 10.

The eight support rollers 325C1, 325C2, 325M1, 325M2, 325Y1, 325Y2, 325K1, and 325K2, disposed opposite the head units 350, keep the transfer belt 328 taut when the head units 350C, 350M, 350Y, and 350K discharge ink droplets. A transfer motor 331 drives the transfer roller 330.

Further, a sensor device 332C is disposed between the support rollers 325C1 and 325C2 and upstream from the ink discharge position of the head unit 350C in the conveyance direction 10 in which the transfer belt 328 rotates. The sensor device 332C includes a speckle sensor, which is an example sensor to acquire data of the transfer belt 328. Similar to the position of the sensor device 332C relative to the support rollers 325C1 and 325C2 and the head unit 350C, the sensor device 332M is disposed for the head unit 350M.

For the head units 350M, 350Y, and 350K, actuators 333M, 333Y, and 333K are provided, respectively. The actuator 333M moves the head unit 350M in the direction orthogonal to the conveyance direction 10 in which the transfer belt 328 rotates. Similarly, the actuators 333Y and 333K move the head units 350Y and 350K, respectively, in the direction orthogonal to the conveyance direction 10 in which the transfer belt 328 rotates.

A control board 340 detects the amount of travel of the transfer belt 328 in the direction orthogonal to the conveyance direction 10 and that in the conveyance direction, based on the image data acquired from the sensor devices 332C, 332M, 332Y, and 332K. Additionally, according to the amount of travel of the transfer belt 328 in the orthogonal direction, the control board 340 controls the actuators 333M, 333Y, and 333K to move the head units 350M, 350Y, and 350K in the orthogonal direction. Additionally, according to the amount of travel of the transfer belt 328 in the conveyance direction 10, the control board 340 controls the timing of liquid discharge from the head units 350M, 350Y, and 350K.

The control board 340 outputs driving signals to the belt driving motor 327 and the transfer motor 331.

The head units 350 are provided with displacement sensors PS31, PS32, and PS33, respectively. The displacement sensors PS31, PS32, and PS33 respectively detect the displacement amounts PD of the head units 350M, 350Y, and 350K and outputs the displacement amounts PD to the control board 340.

Variation 3 can attain the following effects.

When the transfer belt 328 moves (i.e., belt walk) in the direction orthogonal to the direction in which the transfer belt 328 is driven by the driving roller 321 during driving of the transfer belt 328, the liquid discharge apparatus 110 can move the head units 350M, 350Y, and 350K in the orthogonal direction, corresponding to the amount of travel detected. Additionally, owing to the displacement amounts PD of the head units 350M, 350Y, and 350K respectively output from the displacement sensors PS31, PS32, and PS33, the control board 340 can correct the respective command values COM to control the actuators 333M, 333Y, and 333K. Accordingly, the liquid discharge apparatus 110 can form a high-quality image on the transfer belt 328.

When the amount by which the transfer belt 328 rotates in the direction driven by the driving roller 321 is different from a supposed amount, the liquid discharge apparatus 110 can change the timing of liquid discharge from the head units 350M, 350Y, and 350K in response to the amount of rotation detected. Accordingly, the liquid discharge apparatus 110 can form a high-quality image on the transfer belt 328.

In the above-described example, the amount of travel of the transfer belt 328 in the conveyance direction 10 and that in the direction orthogonal thereto are calculated based on the image data acquired from the sensor devices 332C, 332M, 332Y, and 332K. Alternatively, the amount of travel in only one of those directions can be calculated.

Although the head unit 350C does not include an actuator in the above-described example, alternatively, an actuator can be provided. Then, the head unit 350C is moved in the direction orthogonal to the conveyance direction 10, thereby adjusting the position of the head unit 350C in the orthogonal direction at the time of image transfer from the transfer belt 328 onto the sheet.

Although a plurality of head units 350 is used to form an image on the transfer belt 328 in the example described above, alternatively, the operation described above can adopt to forming an image using one head unit.

For example, aspects of this disclosure can adapt to a conveyance device that conveys a substrate (conveyed object) and includes a laser head unit to perform laser patterning on the substrate. A plurality of such laser heads can be lined in the direction orthogonal to the direction of conveyance of the substrate. The conveyance device detects the position of the substrate and moves the head unit based on the detection result. In this case, the position at which the laser lands on the substrate is the operation position of the head.

The number of the head units of the conveyance device is not necessarily two or more. Aspects of this disclosure can adapt to a device configured to keep performing processing at a reference position, on a conveyed object.

Further, one or more of aspects of this disclosure can be embodied as a method performed by a controller of a conveyance device, an information processing apparatus, or the combination thereof to cause the apparatus to perform operation such as liquid discharge, and at least a portion of the method can be implemented by a program. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions. Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A conveyance device comprising:
   a conveyor to convey a conveyed object in a conveyance direction;
   a head unit to perform an operation on the conveyed object;
   an actuator to move the head unit in an orthogonal direction to the conveyance direction;
   an actuator controller to control the actuator;
   a displacement sensor to detect a displacement amount of an actual distance the head unit is moved by the actuator; and
   a controller configured to:
   calculate a detection result including at least one of a position of the conveyed object in the orthogonal direction, a speed of travel of the conveyed object, and a travel amount of the conveyed object;

calculate a command value based on the detection result and the displacement amount output from the displacement sensor; and output the command value to the actuator controller.

2. The conveyance device according to claim 1, wherein the controller is configured to calculate a correction value to correct the command value based on a difference between an amount of travel indicated by the command value and the displacement amount output from the displacement sensor detecting the head unit controlled based on the command value.

3. The conveyance device according to claim 2, wherein the controller is configured to calculate the difference between the amount of travel and the displacement amount a plurality of times to obtain a plurality of differences and calculate the correction value based on the plurality of differences.

4. The conveyance device according to claim 2, wherein the controller is configured to calculate the correction value for each period selected from a period of oscillation of the displacement amount, an integral multiple of the period of oscillation of the displacement amount, a predetermined control period, and an integral multiple of the predetermined control period.

5. The conveyance device according to claim 2, wherein the controller is configured to correct the correction value for each period selected from a period of oscillation of the displacement amount, an integral multiple of the period of oscillation of the displacement amount, a predetermined control period, and an integral multiple of the predetermined control period.

6. The conveyance device according to claim 1, further comprising a conveyed object sensor to detect the conveyed object, the conveyed object sensor disposed corresponding to the head unit, wherein the controller is configured to calculate the detection result based on an output from the conveyed object sensor.

7. The conveyance device according to claim 6, wherein the conveyed object sensor is to detect data representing a rugged shape of the conveyed object.

8. The conveyance device according to claim 6, wherein the conveyed object sensor is to detect an end of the conveyed object in the orthogonal direction.

9. The conveyance device according to claim 6, wherein the conveyed object sensor is an optical sensor.

10. The conveyance device according to claim 6, further comprising:

a first support disposed upstream from an operation position of the head unit in the conveyance direction; and a second support disposed downstream from the head unit in the conveyance direction, wherein the conveyed object sensor is disposed between the first support and the second support.

11. A conveyance system comprising:

a plurality of conveyance devices, each of which includes:

a conveyor to convey a conveyed object in a conveyance direction;

a head unit to perform an operation on the conveyed object;

an actuator to move the head unit in an orthogonal direction to the conveyance direction;

an actuator controller to control the actuator; and a displacement sensor to detect a displacement amount of an actual distance the head unit is moved by the actuator; and a controller configured to:

calculate a detection result including at least one of a position of the conveyed object in the orthogonal direction, a speed of travel of the conveyed object, and a travel amount of the conveyed object;

calculate a command value based on the detection result and the displacement amount output from the displacement sensor; and output the command value to the actuator controller.

12. A method for adjusting a position of a head unit to perform an operation on a conveyed object, the method comprising:

detecting a displacement amount of an actual distance the head unit is moved by an actuator in an orthogonal direction to a conveyance direction in which the conveyed object is conveyed;

calculating a detection result including at least one of a position of the conveyed object in the orthogonal direction, a speed of travel of the conveyed object, and a travel amount of the conveyed object; and adjusting, with the actuator, the position of the head unit based on the detection result and the displacement amount.

* * * * *